United States Patent
Torres et al.

(10) Patent No.: US 9,635,149 B2
(45) Date of Patent: Apr. 25, 2017

(54) METHOD AND APPARATUS FOR DYNAMIC ASSOCIATION OF TERMINAL NODES WITH AGGREGATION NODES AND LOAD BALANCING

(75) Inventors: Robert Torres, New Market, MD (US); George Choquette, Potomac, MD (US); John Border, Adamstown, MD (US); Vivek Gupta, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 547 days.

(21) Appl. No.: 13/459,869

(22) Filed: Apr. 30, 2012

(65) Prior Publication Data
US 2013/0286833 A1   Oct. 31, 2013

(51) Int. Cl.
| | |
|---|---|
| H04L 29/06 | (2006.01) |
| H04W 28/08 | (2009.01) |
| H04B 7/185 | (2006.01) |
| H04W 88/16 | (2009.01) |
| H04L 12/26 | (2006.01) |

(52) U.S. Cl.
CPC ......... *H04L 69/24* (2013.01); *H04B 7/18517* (2013.01); *H04W 28/08* (2013.01); *H04L 43/0811* (2013.01); *H04L 43/10* (2013.01); *H04W 88/16* (2013.01)

(58) Field of Classification Search
None
See application file for complete search history.

(56) References Cited

U.S. PATENT DOCUMENTS

2011/0131338 A1* 6/2011 Hu .............................. 709/229
2013/0100815 A1* 4/2013 Kakadia et al. ............. 370/237

* cited by examiner

*Primary Examiner* — Marcus R Smith
(74) *Attorney, Agent, or Firm* — Potomac Technology Law, LLC

(57) ABSTRACT

A system and method for association of remote nodes with respective aggregation nodes in a high capacity shared bandwidth communications network, which meets various requirements and desires associated with efficient, robust, reliable and flexible broadband services, and which is relatively efficient and automated from a network management and load balancing standpoint, is provided. A remote node receives a message transmitted by a gateway over the communications network, wherein the message includes service codes identifying one or more service capabilities of the gateway. The remote node determines, based on the service codes, whether the gateway is an eligible gateway for servicing one or more service requirements of the remote node. The remote node then adds the gateway to a pool of eligible gateways within the communications network.

30 Claims, 13 Drawing Sheets

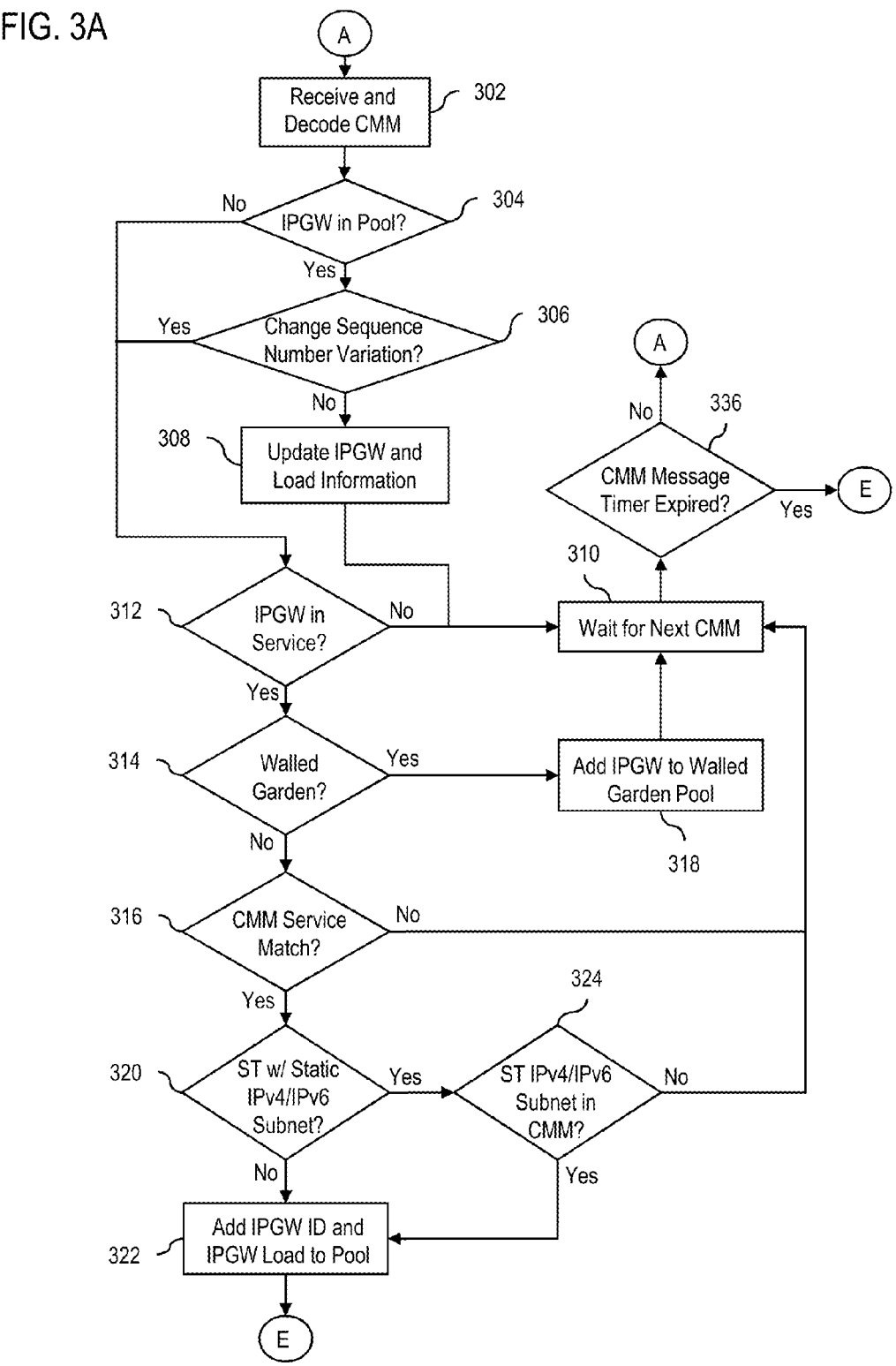

METHOD AND APPARATUS FOR DYNAMIC ASSOCIATION OF TERMINAL NODES WITH AGGREGATION NODES AND LOAD BALANCING

FIELD OF THE INVENTION

Embodiments of the present invention relate to a system and method for association of remote nodes with respective aggregation nodes in a shared bandwidth communications network (e.g., a shared bandwidth satellite communications network).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. In current systems, for example, where multiple remote nodes are capable of accessing a public network (e.g., the Internet) or a remote network through one or more aggregation nodes, assignment of remote nodes to a gateway or aggregation node is relatively static. Operations teams spend a significant amount of time manually load balancing, and providing an appropriate static assignment of remote nodes to respective gateways. Such static assignments, however, are relatively inflexible, and thus create challenges and inefficiencies in network management, especially where system loads dynamically change over given periods of time. Further, in the case of a relatively static assignment of IP addresses to remote nodes, based on the static assignment of a remote node to a gateway, in the event that a terminal is moved to a different gateway, a hole is created in the address space of the gateway (based on the IP address assigned to the remote node that is reassigned to another gateway). Accordingly, current systems fail to support efficient, robust, reliable and flexible broadband services, in such shared bandwidth network environments, utilizing such high capacity satellite systems.

Achieving efficient, robust, flexible and fast broadband services, in such a shared bandwidth network, however, poses unique challenges to system designers and operators. For instance, difficulties arise in utilizing existing protocols (e.g., address assignment mechanisms in DHCP and TCP IP networks), while still optimally handling the bandwidth. Further, design challenges exist in ensuring that a remote node can identify a set of available aggregation nodes capable of providing the required services, and ensuring that load balancing is dynamically employed across the aggregation nodes to avoid overloading any one aggregation node. With respect to configuration management, while somewhat automated in current systems, the management of remote nodes from a configuration and services standpoint, is susceptible to lock-step upgrades of remote nodes and gateways being out of sync. From a business standpoint, it is also desirable (yet challenging from a design standpoint) to ensure that a remote node cannot access service levels beyond those to which it is subscribed, and to avoid the creation of routing holes that are hard to manage and troubleshoot. Further challenges arise in the design of a graceful recovery from a failure of an aggregation node, with a quick load balancing of the load to the other aggregation nodes, and for a geographically diverse gateway site to provide service to remote nodes without requiring configuration knowledge regarding how to service those remote nodes.

What is needed is a system design that employs a dynamic and flexible architecture and method for association of remote nodes with respective aggregation nodes in a shared bandwidth network, which would meet various requirements and desires associated with efficient, robust, reliable and flexible broadband services, and which would be relatively efficient and automated from a network management and load balancing standpoint.

SOME EXEMPLARY EMBODIMENTS

The present invention advantageously addresses the needs above, as well as other needs, by providing a dynamic and flexible architecture and method for association of remote nodes with respective aggregation nodes in a shared bandwidth communications network (e.g., a shared bandwidth satellite communications network), which meets various requirements and desires associated with efficient, robust, reliable and flexible broadband services, and which is relatively efficient and automated from a network management and load balancing standpoint.

According to an exemplary embodiment, a method comprises, receiving, by a terminal device, a message transmitted by a gateway over a communications network, wherein the message includes service codes identifying one or more service capabilities of the gateway. The method further comprises determining, based on the service codes, whether the gateway is an eligible gateway for servicing one or more service requirements of the terminal device, and adding the gateway to a pool of eligible gateways within the communications network. According to a further exemplary embodiment, the method further comprises determining whether the gateway is one of the pool of eligible gateways. If it is determined that the gateway is one of the pool of eligible gateways, then the method further comprises determining whether a change sequence number included in the message indicates a configuration change of the gateway, and, if it is determined that the change sequence number indicates a configuration change of the gateway, then the method further comprises updating information associated with the gateway in a database of information regarding the gateways in the pool of eligible gateways. According to yet a further exemplary embodiment, the message further includes load information specifying a load of the gateway, and the method further comprises maintaining a database of information regarding the gateways in the pool of eligible gateways, wherein the information of the database includes load information specifying a load for each of the gateways of the pool of eligible gateways, and selecting a gateway from the pool of eligible gateways via a load balancing selection algorithm based on the load information of the gateways, and transmits an association request message to the selected gateway.

According to an additional exemplary embodiment, a method comprises receiving, by a gateway, an association request message from a terminal device, wherein the association request message includes a service signature and service parameters of the terminal device. The method further comprises determining, based on the service signature, whether the association request message reflects a valid request. The method also comprises determining one or more service requirements of the terminal device, wherein the determination of the service requirements is based on a correspondence between the service parameters and associated information of a service requirement database of the gateway, determining whether the gateway is configured for servicing the service requirements of the terminal device, and transmitting, in response to the determination whether the gateway is configured for servicing the service requirements of the terminal device, an association accept message, including one or more association parameters.

According to an additional exemplary embodiment, a method comprises receiving, by a terminal device, a message transmitted by a gateway over a communications network, wherein the message includes load information specifying a load for the gateway. The method further comprises determining that the terminal device is associated with the gateway for transmission and receipt of service data traffic over the communications network via the gateway, determining whether the load of the associated gateway exceeds one or more of a predetermined threshold and a cutoff load of the gateway, and randomly determining to terminate the association with the gateway, if it is determined that the load of the associated gateway exceeds one or more of a predetermined threshold and a cutoff load of the gateway. Alternatively, the method further comprises determining whether the terminal device is in an idle state, wherein the terminal device has not transmitted or received any service data traffic for a predetermined period of time, and wherein the determination to terminate the association with the gateway only occurs if the terminal device is in the idle state.

According to a further exemplary embodiment, an apparatus comprises at least one processor, and at least one memory including computer program code for one or more programs. The at least one memory and the computer program code are configured to, with the at least one processor, cause the apparatus to perform at least the following. The apparatus is caused to receive a message transmitted by a gateway over a communications network, wherein the message includes service codes identifying one or more service capabilities of the gateway, to determine, based on the service codes, whether the gateway is an eligible gateway for servicing one or more service requirements of the apparatus, and to add the gateway to a pool of eligible gateways within the communications network. According to a further exemplary embodiment, the apparatus is further caused to determine whether the gateway is one of the pool of eligible gateways. If it is determined that the gateway is one of the pool of eligible gateways, then the apparatus is further caused to determine whether a change sequence number included in the message indicates a configuration change of the gateway, and, if it is determined that the change sequence number indicates a configuration change of the gateway, then the apparatus is further caused to update information associated with the gateway in a database of information regarding the gateways in the pool of eligible gateways. According to yet a further exemplary embodiment, the message further includes load information specifying a load of the gateway, and the apparatus is further caused to maintain a database of information regarding the gateways in the pool of eligible gateways, wherein the information of the database includes load information specifying a load for each of the gateways of the pool of eligible gateways, and to select a gateway from the pool of eligible gateways via a load balancing selection algorithm based on the load information of the gateways, and to transmit an association request message to the selected gateway.

According to an additional exemplary embodiment, an apparatus comprises at least one processor, and at least one memory including computer program code for one or more programs. The at least one memory and the computer program code are configured to, with the at least one processor, cause the apparatus to perform at least the following. The apparatus is caused to receive an association request message from a terminal device, wherein the association request message includes a service signature and service parameters of the terminal device. The apparatus is further caused to determine, based on the service signature, whether the association request message reflects a valid request. The apparatus is also caused to determine one or more service requirements of the terminal device, wherein the determination of the service requirements is based on a correspondence between the service parameters and associated information of a service requirement database of the gateway, to determine whether a gateway is configured for servicing the service requirements of the terminal device, and to transmit, in response to the determination whether the gateway is configured for servicing the service requirements of the terminal device, an association accept message, including one or more association parameters.

According to an additional exemplary embodiment, an apparatus comprises at least one processor, and at least one memory including computer program code for one or more programs. The at least one memory and the computer program code are configured to, with the at least one processor, cause the apparatus to perform at least the following. The apparatus is caused to receive a message transmitted by a gateway over a communications network, wherein the message includes load information specifying a load for the gateway. The apparatus is further caused to determine that the apparatus is associated with the gateway for transmission and receipt of service data traffic over the communications network via the gateway, to determine whether the load of the associated gateway exceeds one or more of a predetermined threshold and a cutoff load of the gateway, and to randomly determine to terminate the association with the gateway, if it is determined that the load of the associated gateway exceeds one or more of a predetermined threshold and a cutoff load of the gateway. Alternatively, the apparatus is further caused to determine whether the apparatus is in an idle state, wherein the apparatus has not transmitted or received any service data traffic for a predetermined period of time, and wherein the determination to terminate the association with the gateway only occurs if the apparatus is in the idle state.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A depicts a flow chart illustrating an ST algorithm for creation of an IPGW pool, and for adding an IPGW to the IPGW pool of the ST, in accordance with an exemplary embodiment;

DETAILED DESCRIPTION

Figure 1A:
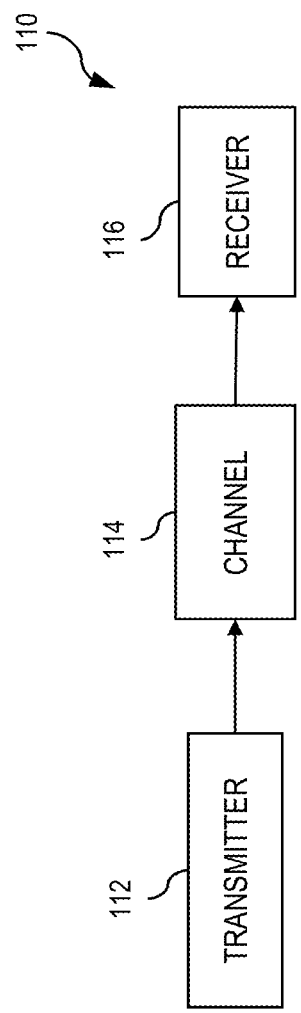
FIGS. 1A, 1B and 1C illustrate communications systems capable of employing an architecture and method for association of remote nodes with respective aggregation nodes, in accordance with various exemplary embodiments.

In accordance with an aspect of the present invention, dynamic and flexible architectures and methods are provided for association of remote nodes with respective aggregation nodes in a shared bandwidth communications network (e.g., a shared bandwidth satellite communications network), which meet various requirements and desires associated with efficient, robust, reliable and flexible broadband services, and which is relatively efficient and automated from a network management and load balancing standpoint.

In such a shared bandwidth network, for example, where multiple remote nodes access broadband services through one or more aggregation nodes (e.g., gateways), according to various exemplary embodiments, the present architecture and method for association of remote nodes with respective aggregation nodes satisfies various requirements and desires related to the provision of efficient, robust, reliable and flexible broadband services. For example, in accordance with an exemplary embodiment, based on the services for which a remote node (e.g., a user terminal or node) is configured (e.g., the services to which a user of the terminal has subscribed), the terminal utilizes one or more quantitative service criteria for selecting a pool of aggregation nodes that meet such service criteria. In other words, a terminal selects an aggregation node from an eligible pool of aggregation nodes or gateways that support service configurations and subscriptions that satisfy the service requirements of the terminal. For example, download throughput and download volume usage policy represent two such quantitative service criteria. The download throughput reflects the maximum speed (in Mbps) which a terminal is configured to sustain in the receive direction from the network, for user data. The download throughput, for example, is based on the service plan to which the terminal is subscribed (e.g., based on the user service subscriptions). The download usage volume reflects the amount of data in MB or GB that a terminal is configured to receive from the aggregation node in the download direction. The download usage volume may be based on an option selected by the user when signing up for a service plan. A terminal associates with an aggregation node by selecting a particular node (from a pool of suitable aggregation nodes available to the terminal) for provision of the required services to the terminal. Once the terminal completes an association process according to exemplary protocols of embodiments of the present invention, and the aggregation node accepts the association, the terminal becomes associated with the selected aggregation node.

Further, the present method and architecture provides for pooled redundancy and automatic and dynamic load balancing. According to one exemplary embodiment, terminals load balance as they enter the system, and also load balance dynamically during operation of the system. Terminals overcome aggregation node failures by load balancing across other active aggregation nodes of the same pool, which would save the requirement for one-to-one hot redundancy for recovering from hardware failures. Terminals also dynamically transition to a diverse gateway, for example, when a gateway or communications link failure requires a transition to a secondary gateway (which, for example, may be a redundant gateway or an operational gateway at a diverse site). Moreover, in accordance with embodiments of the present invention, such dynamic association and reassociation for dynamic load balancing is all accomplished without requiring shut-down and/or reconfiguration of the aggregation node or gateway components, or the terminals. Moreover, such embodiments of the present invention provide for scalability and flexibility of modifying, enhancing or expanding the criteria for aggregation node pool creation and selection, for example, to expand or enhance service offerings.

Additionally, in accordance with exemplary embodiments, the present method and architecture satisfies various system requirements, such as the need to preserve the IPv4 public address space, and the need to switch remote nodes or terminals to aggregation nodes at a geographically diverse gateway site, which service the remote nodes on behalf of multiple primary gateway sites. The need to switch to a geographically diverse site, for example, may be based on multiple purposes, including site redundancy, RF diversity, disaster recovery, site maintenance, etc. In the area of configuration management, the present method and architecture provides for a distributed configuration management system, whereby configuration or service changes of a remote node do not require reconfiguration of the respective gateway servicing that remote node-configuration management is distributed to the remote nodes in an automated fashion. Moreover, in accordance with exemplary embodiments, the present method and architecture provides scalability and flexibility for extension to support future services that may change the selection and decision process of a remote node.

In accordance with one exemplary embodiment, such a shared bandwidth network comprises a broadband satellite communications system, where multiple remote nodes (e.g., satellite terminals (STs)) access broadband services through one or more aggregation nodes (e.g., gateways (GWs) or IP gateways (IPGWs). For instance, different STs subscribe to different services, whereby the STs associate with respective IPGWs that support the respective services of the terminal. An ST would dynamically select an IPGW from an eligible pool of IPGWs that support service configurations and subscriptions that satisfy the service requirements of the ST. The ST associates with the selected IPGW for provision of the required services to the terminal. Once the ST completes an association process, and the IPGW accepts the association, the terminal becomes associated with the selected IPGW.

Figure 1B:
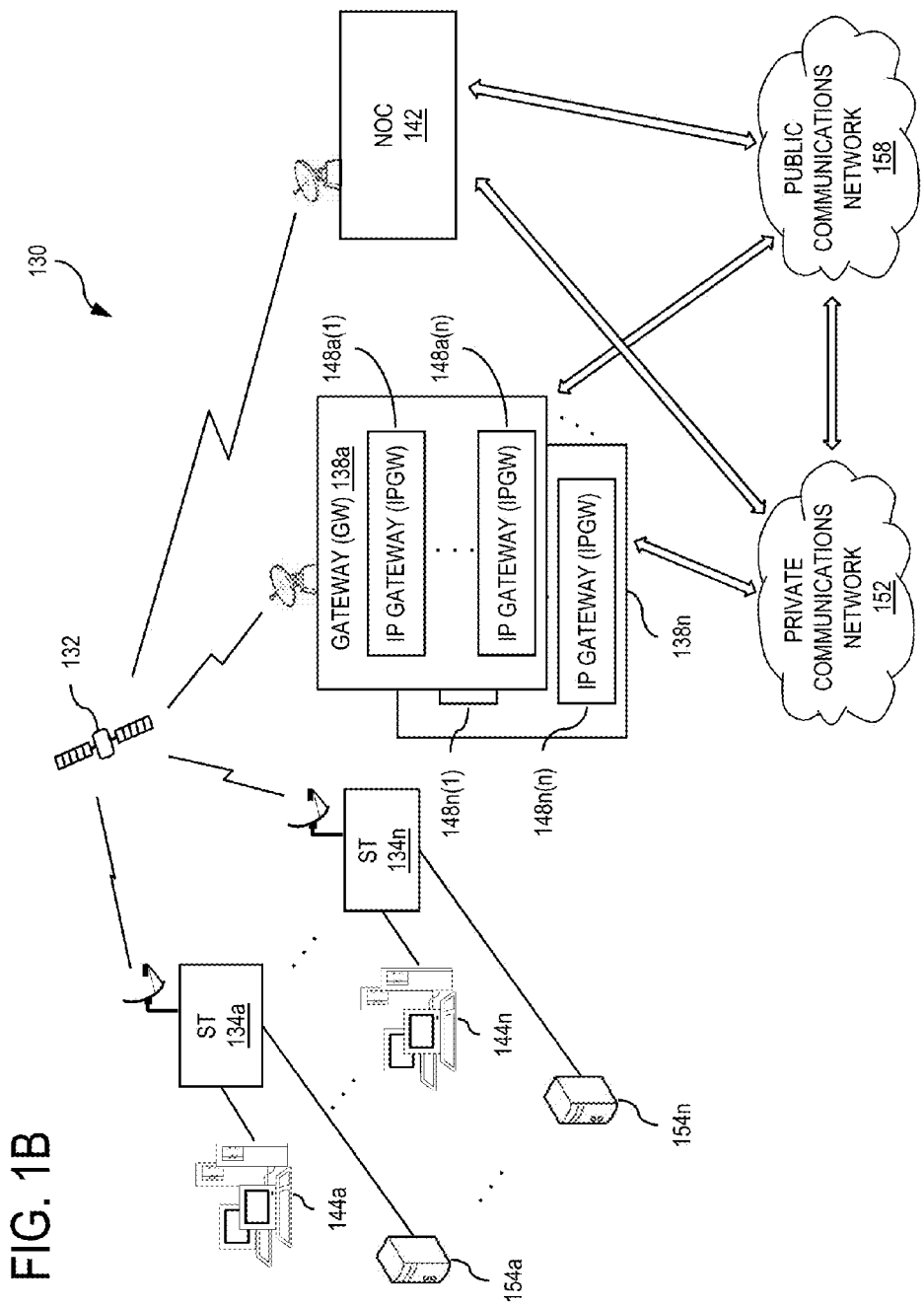
Figure 1C:
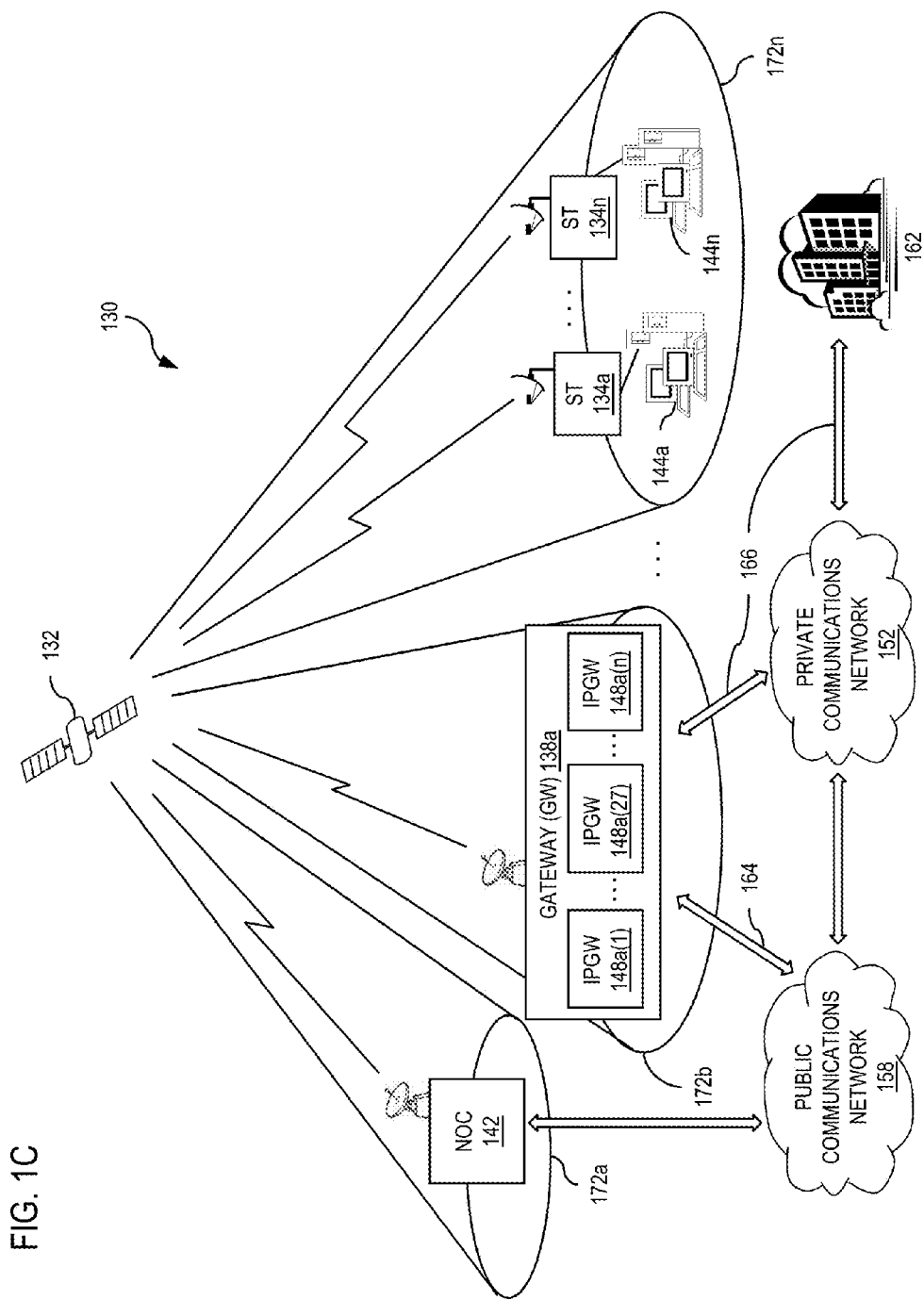

FIGS. 1A-1C illustrate communications systems capable of employing a dynamic and flexible architecture and method for association of remote nodes with respective aggregation nodes, according to various exemplary embodiments of the present invention. With reference to FIG. 1A, a digital communications system 110 includes one or more transmitters 112 (of which one is shown) that generate signal waveforms across a communication channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. Coding may be utilized to combat noise and other issues associated with the channel 114, such as forward error correction (FEC) codes.

FIG. 1B illustrates an exemplary satellite communications system 130 capable of supporting communication among terminals with varied capabilities, according to exemplary embodiments of the present invention. Satellite communications system 130 includes a satellite 132 that supports communication among multiple satellite terminals (STs) 134a-134n, a number of gateways (GWs) 138a-138n, and a network operations center (NOC) 142. The NOC 142 performs the management plane functions of the system 130, while the GWs 138a-138n perform the data plane functions of the system 133. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC have connectivity to one or more public communications networks, such as the Internet or a PSTN.

According to a further exemplary embodiment, each of the GWs 138a-138n include one or more gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system may support direct unicast (point-to-point) communications and multicast communications among the STs 134a-134n and GWs 138a-138n. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). According to exemplary embodiments, the system 130 thereby provides a fully meshed architecture, whereby the STs 134a-134n directly communicate, via a single hop, over the satellite 132.

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam (e.g., beams 172a-172n) operates as a bent-pipe to geographic region covered by the beam. For example, each spot beam operates as a bent pipe communications channel to and from the STs and/or IPGW(s) within the geographic region covered by the beam. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134*n*, located at a remote corporate location, may desire to securely communicate with the corporate headquarters 162. Accordingly, for a data communication from ST 134*n* to the corporate headquarters 162, the data is first transmitted, via the satellite 132, from the ST 134*n* to an IPGW associated with the ST 134*n* (e.g., IPGW 148*a*(27)). The IPGW 148*a* (27) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communication from the corporate headquarters to a number of remote sites (e.g., a multicast communication to STs 134*a*-134*n*)—where STs 134*a*-134*n* are correspondingly associated with the two IPGWs 148*a*(1) and 148*a*(27) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148*a*(1) and 148*a*(27). The IPGWs determine that the communication is destined for the remote STs 134*a*-134*n*, and package the data as a multicast communication addressed to the community of STs 134*a*-134*n*. The IPGWs then transmit the data communication, via the satellite 132, for decoding by the community of STs 134*a*-134*n*. Accordingly, the satellite of such a system acts as a bent pipe or repeater, transmitting communications between the STs 134*a*-134*n* and their respective associated IPGWs 148*a*-148*n*.

Moreover, according to various exemplary embodiments, STs would be capable of performing dynamic load balancing at various different levels. For example, according to one such embodiment, a group of STs perform load balancing across IPGWs of a pool of IPGWs servicing an outroute accessible to the group of STs. According to a further embodiment, depending on the architecture and configuration of the network, STs perform load balancing across multiple outroutes of multiple IPGWs (either within a single satellite beam or across geographically diverse IPGWs), where the messaging to and from the various IPGWs is directed by the satellite to the beam(s) within which the STs are located, and on channels that the STs are capable of accessing. The various exemplary embodiments of the present invention provide the STs with the capability of dynamic and flexible IPGW association, based on the IPGW messaging available to an ST at any given moment. Accordingly, there is virtually no requirement for preconfiguration of the IPGWs to load balance the STs based on a predetermined loading plan, or for reconfiguration of the IPGWs for rebalancing the loads at any given time. The STs manage the load balancing in a dynamic and flexible manner, by controlling the association and reassociation with respective IPGWs as the network loading changes over time, without requiring maintenance shut-downs, or wholesale reassignments of STs to perform IPGW reconfiguration.

In accordance with exemplary embodiments, the present system provides protocols for dynamic and flexible processes (e.g., IPGW pool creation, and IPGW selection and association) by which an ST associates with an IPGW (described in further detail below). This concept of association facilitates a dynamic assignment of STs to IPGWs, which, among other requirements and advantages, satisfies the following needs: (1) support pooled IPGW redundancy (as opposed to one-to-one redundancy); (2) dynamic load balancing across IPGWs (as opposed to requiring manual moves of STs to IPGWs for load balancing or rebalancing); (3) flexibility in IPGW redundancy by eliminating the need to provide real-time configuration information to STs and IPGWs upon a switchover to a redundant IPGW. According to this association protocol, an IPGW is not required to maintain any knowledge or pre-configuration of STs that it may be designated to service. Instead, STs generate a pool of available IPGWs that are capable of satisfying the service capabilities and subscriptions of the ST. The IPGW pool is determined by the ST based on capabilities multicast messages of all IPGWs from which the ST receives a multicast message on the outroute stream of the ST. For example, the IPGW pool consists of the set of IPGWs, which are capable of servicing the ST based on the ST service configuration and subscriptions and thus represent a pool of candidate IPGWs with which the ST may associate. The IPGW pool is determined by an ST by filtering all such multicast messages received by the ST to determine the IPGWs that match the terminals service requirements. The terminal selects an IPGW from the IPGW Pool. Examples of the service needs of a terminal include, without limitation, support for download throughput, support for a given static IPv4 address subnet, etc. According to the present protocol, however, the concept of services is kept generic to provide for flexibly, and expanding the supported services, as further services are provided, for example, that may be supported by only on a subset of IPGWs. Alternatively, the capabilities message may be transmitted via a message protocol other than a multicast message protocol, such as a unicast (point-to-point) protocol or a broadcast protocol.

According to an exemplary embodiment, the terminals are configured with service parameter information specifying the services that the terminal is configured to receive. The service parameter information includes, for example: an identifier indicating the download throughput that the terminal should be able to receive; an identifier indicating the download usage volumes per priority that the terminal should be able to receive; one or more identifiers indicating various services that the terminal could receive, such as, voice over IP, video streaming, video conferencing, multicast IP services, a static IPv4IPv6 subnet, if the terminal is subscribed to a static IPv4/IPv6 plan. A terminal uses such configuration information to match against the capabilities being reported by the IPGWs on the outroute stream of the terminal. Based on the receipt of a capabilities multicast message (CMM) from a given IPGW (as described in further detail below), the terminal may add that IPGW to the pool of eligible IPGWs capable of supporting the services to which the terminal is configured/subscribed. This allows the IPGW to be selected by terminals for association. As long as terminals receive the CMM from this IPGW and the IPGW status does not indicate that the IPGW is not accepting associations, terminals may associate with the IPGW. If the CMM stops being received or the IPGW status in the CMM indicates that it is no longer in service, terminals remove the IPGW from their eligible pool and terminals already associated with the IPGW lose their association with the IPGW.

Once an ST has determined an IPGW pool of eligible IPGWs, the terminal selects an IPGW from the pool with which to associate for receiving network services. According to one exemplary embodiment, the ST selects the particular IPGW with which to associate through a load balancing algorithm. For example the ST employs a weighted random selection algorithm, based on relative loading information provided by the multicast messages of the IPGWs, to select a particular IPGW with which to associate. Once the IPGW has been selected, the ST provides an association request message to the IPGW, including service codes identifying the service parameter information of the terminal. The association request message may include further information, such as the current service state of the ST (e.g., suspended or not). The IPGW replies with either an association accept message or an association reject message. Once associated, the ST routes its communication data traffic through that IPGW. Additionally, the STs continually monitor the load of the IPGWs of the available pool, and, if certain criteria are met, an ST may disassociate from the current IPGW and randomly select another IPGW from the same pool.

According to a further exemplary embodiment, a service signature key may be used to generate a service signature for an ST. The service signature serves as a signed or hashed version of the terminal service parameters, which serves to protect against a hacker tampering with the service parameter information of an ST, in an attempt to upgrade the service plans of the ST over and above the service plans to which the ST is subscribed. For example, a network management system generates the service signature for an ST by signing or hashing the respective service parameters of the terminal based on the service signature key, and provides the service parameters and the service signature to the ST (e.g., during initial configuration of the ST). Then, once the ST selects an IPGW with which to associate, the ST provides its service parameters and the respective service signature to the IPGW along with the association request message. The IPGW then signs the service parameters received from the ST with the same service signature key, and verifies that the signed service parameters match the service signature received from the ST to verify that the received service parameters are valid (e.g., have not been tampered with). Further, the IPGW also compares the service parameters received from the ST with its own service parameters to verify that the IPGW is capable of satisfying the service requirements of the ST.

According to an exemplary embodiment, the IPGW is preconfigured with service parameter information regarding the services it supports, and a service signature key, which serves to protect against tampering with the service parameter information of an ST in an attempt to upgrade the service plans of the ST over and above the service plans to which the ST is subscribed (as described below). The service parameter information includes, for example: identifier(s) indicating the download throughput(s) that the IPGW supports along with the download throughput(s) to which the indentifier(s) map; the download usage volumes that the IPGW provides; the configuration for the services that the IPGW provides, such as classification and traffic policing rules for voice and video services, multicast IP and conditional access information for multicast IP services; and whether the IPGW supports static IPv4/IPv6 subnets and, if so, the static IPv4/IPv6 subnets it services. When the IPGW receives an association request message from an ST, before the IPGW accepts the association request, the IPGW compares the service parameter information of the ST with its own service parameter information to ensure that the IPGW is capable of satisfying the service requirements of the ST.

As soon as the IPGW comes to an operational state where the IPGW is ready to service terminals, the IPGW starts multicasting a capabilities message (CMM). The IPGW periodically transmits its capabilities multicast message (CMM). The CMM indicates the loading, service parameter information (service capabilities of the IPGW), and current state of the IPGW. The CMM is multicast from each IPGW to every terminal in the outroute stream on which the IPGWs traffic is transmitted. Each IPGW periodically multicasts the CMM, provided that the IPGW has a service signature key, is in a service state (e.g., not in a maintenance state), and has a configuration related to capabilities. While each IPGW sends the CMM out at a similar periodicity, the periodicity is configurable, and synchronization is not required across IPGWs as to when they actually send the CMM. Under certain conditions (addressed below), an IPGW may send the CMM more frequently than the standard periodicity. Further, each IPGW has particular configuration that allows it to report service information (e.g., capabilities of the IPGW) in a message (e.g., the CMM) to the STs. Anytime an IPGW receives a configuration update that changes its service configuration or capabilities, the IPGW promptly transmits a new CMM reporting the updated service configuration. As specified above, alternatively, the capabilities message may be transmitted via a message protocol other than a multicast message protocol, such as a unicast (point-to-point) protocol or a broadcast protocol.

According to one embodiment, each CMM contains an alphanumeric string serving as a logical identifier (ID) for the IPGW. The logical identifier may be accessible by a user of the ST or a customer service system in order to facilitate reporting of outages or service issues with respect to a particular IPGW. The CMM also contains a data WAN IP address of the IPGW, which serves as the IP address through which STs communicate with the IPGW. The CMM also contains a current loading metric, which indicates a relative loading level of the IPGW compared to other IPGWs in the same IPGW pool, and an IPGW service status indicator (e.g., out of service, degraded, normal operation). Reporting of status other than normal, for example, facilitates faster reassociation time (as opposed to a termination of the transmission of the CMM messages from the IPGW), and the provision of information for conveying conditions where service may be degraded. The CMM also contains a Last Reboot Timestamp, which conveys the time at which the IPGW last rebooted. Accordingly, knowledge of the last reboot time of the IPGW would permit the ST to recover in a more efficient and timely manner, as opposed to waiting for an association timeout. In other words, if an ST determines that the last reboot time of an IPGW with which the ST is associated is more recent than the time of association, then the IPGW will no longer recognize the association with that ST (the association would have been terminated by the IPGW reboot). The CMM also contains a Change Sequence Number, which reflects a version or change status of the IPGW (e.g., the Change Sequence Number consists of a monotonically increasing number that is changed when static information within the CMM changes). The Change Sequence Number notifies the ST as to when the CMM static fields have changed, so that the ST need not be burdened with parsing most of the CMM when static fields have not changed. In accordance with a further embodiment, the CMM also includes information reflecting the web acceleration servers available through the respective IPGW, along with current load information for each of the servers. In such a case, the STs may further load balance across the web acceleration servers by establishing an acceleration session with a web acceleration server that is not overloaded, and that is accessible via the IPGW with which the terminal is associated.

For example, the following table reflects potential terminal actions based on the Last Reboot Timestamp and the Change Sequence Number (Note that cases 7-9 should not occur, but are provided for completeness—e.g., in the event that a CMM contains an inaccurate timestamp, the ST should know how to deal with it to avoid further complications and/or delay):

| Case | Last Reboot Timestamp | Change Sequence Number | Terminal Action |
|---|---|---|---|
| 1 | Unchanged | Unchanged | No action on static content; still needs to process dynamic content (e.g., load) |
| 2 | Unchanged | Incremented | ST should process entire CMM |
| 3 | Unchanged | Decremented | ST should process entire CMM |
| 4 | More recent than Timestamp of Previous CMM | Unchanged | Associated ST should consider itself unassociated |
| 5 | More recent than Timestamp of Previous CMM | Incremented | Associated ST should consider itself unassociated |
| 6 | More recent than Timestamp of Previous CMM | Decremented | Associated ST should consider itself unassociated |
| 7 | Less recent than Timestamp of Previous CMM | Unchanged | Associated ST should consider itself unassociated |
| 8 | Less recent than Timestamp of Previous CMM | Incremented | Associated ST should consider itself unassociated |
| 9 | Less recent than Timestamp of Previous CMM | Decremented | Associated ST should consider itself unassociated |

According to a further exemplary embodiment, the CMM further contains a capability set, which comprises a list of variables, where some of which can be set to all or none rather than a specific value. Example values for the capability set include:

Public/Static IPv4 Subnets serviced, such that, when a customer is subscribed to a static IPv4 subnet, the ST must be directed to an IPGW reporting routing reachability to that subnet;

Public/Static IPv6 Subnets serviced, such that when a customer is subscribed to a static IPv6 subnet, the ST must be directed to an IPGW reporting routing reachability to that subnet;

Service Plan Type Identifiers, which consist of one or more type/value pairs or Booleans that point out the services that the IPGW provides, such as download throughput capabilities of the IPGW, download volume usage policing plans of the IPGW, VoIP service capabilities of the IPGW (if present), multicast IP service capabilities of the IPGW (if present), video over IP streaming service capabilities of the IPGW (if present)—Further, future additional services may be added in a backward compatible manner to the service plan identifier list;

Customer Identifier, which serve as an indicator of a particular customer whose STs are designated to use the IPGW (e.g., in an enterprise or reseller situation to allow the enterprise or reseller to have dedicated IPGW(s), separate from other enterprise or service provider IPGWs);

Max Supported SW Version, which would specify the highest ST software version supported by the IPGW—as an example, the max supported SW version is used for rollout and test scenarios, where newer software is directed to a limited set of IPGWs;

Max Supported HW Version, which would specify the highest ST hardware version supported by the IPGW—as an example, the max supported HW version is also used for rollout and test scenarios, where newer ST hardware is directed to a limited set of IPGWs;

Supported Hashing Algorithms, for providing a list of Service Signature hashing algorithms supported by the IPGW, which may be used in the scenario of upgrades to the hashing algorithms;

Walled Garden Access (described below), which would indicate that the IPGW supports a walled garden configuration.

The behavior of an ST generally depends upon several potential stimuli. Such stimuli include, for example: receipt or lack of receipt of a CMM from a given IPGW; whether an IPGWs CMM matches the service configuration of the terminal; whether the terminal is currently associated with the IPGW whose CMM is being processed; whether the IPGW whose CMM is being processed is currently in the terminal IPGW pool; whether the CMM is reporting a load change; and whether the CMM is reporting a state change. For example, possible scenarios of the actions an ST may take based on receipt of a CMM from IPGW A, and based on such stimuli, are illustrated in the following table (where, a "Y" indicates yes, an "N" indicates no, and an "X" indicates a don't care case):

| Case | CMM Match? | Associated with IPGW A? | IPGW A in Pool? | IPGW Load Change? | IPGW Status Change? | Action |
|---|---|---|---|---|---|---|
| 1 | N | N | N | X | X | None |
| 2 | N | N | Y | X | X | Remove IPGW A from IPGW pool |
| 3 | N | Y | Y | X | X | Transition to Selecting IPGW state |
| 4 | Y | N | N | X | X | Add IPGW A to IPGW pool |
| 5 | Y | N | Y | Y | N | Record new load for IPGW A |
| 6 | Y | Y | Y | Y | N | Record new load for IPGW A |
| 7 | Y | N | Y | N | Y (e.g., Active to Out of Service) | Record new state for IPGW A |
| 8 | Y | N | Y | N | Y (e.g., Out of Service to Active) | Record new state for IPGW A |
| 9 | Y | N | Y | Y | Y (e.g., Active to Out of Service) | Record new state and load for IPGW A |

-continued

| Case | CMM Match? | Associated with IPGW A? | IPGW A in Pool? | IPGW Load Change? | IPGW Status Change? | Action |
|---|---|---|---|---|---|---|
| 10 | Y | N | Y | Y | Y (e.g., Out of Service to Active) | Record new state and load for IPGW A |
| 11 | Y | Y | Y | X | Y (e.g., Active to Out of Service) | Transition to Selecting IPGW state |

To further elaborate on the scenarios of this table, for example, with regard to case 1, the ST is not associated with an IPGW and the IPGW is not in the IPGW pool of the ST, so the terminal ignores CMM messages from that IPGW where there is a mismatch in service capabilities. With regard to case 2, the IPGW is removed from the IPGW pool of the ST, because the IPGW capabilities no longer match the service requirements of the ST. With regard to case 3, the ST switches to the state of selecting an IPGW, because the terminal is associated with an IPGW with capabilities that no longer match the service requirements of the ST (note that the IPGW can also be removed from the IPGW pool of the ST). Case 4 reflects the scenario of a CMM match for an IPGW that is not in the IPGW pool of the ST, and thus the IPGW is added to the pool. Cases 5 and 6, respectively reflects scenarios of a load change for an IPGW that is in the IPGW pool of the ST, and for an IPGW with which the ST is associated, and thus the load of the IPGW is updated in the pool. With regard to cases 7 and 8, the IPGW is in the IPGW pool of the ST, and thus the status of the IPGW is changed in the pool to reflect the new status of the IPGW. With regard to cases 9 and 10, the IPGW is in the IPGW pool of the ST, and thus the status of the IPGW is changed in the pool to reflect the new status of the IPGW. With regard to case 11, the ST transitions to the state of selecting an IPGW, because it is associated with an IPGW that is no longer in service. Further, in a scenario where an ST is associated with an IPGW, but the ST does not receive a CMM from the IPGW for a configurable predetermined number of received CMM messages or timeout period, the ST would transition to the state of selecting an IPGW, to choose a new IPGW with which to associate. Similarly, in a scenario where an IPGW is in the IPGW pool of an ST (but the ST is not associated with that IPGW), but the ST does not receive a CMM from the IPGW for a configurable predetermined number of received CMM messages or timeout period, the ST would remove the IPGW from its IPGW pool. It should be noted that a single missed CMM should not cause an ST to disassociate from an IPGW or remove the IPGW from its IPGW pool, but rather, after a configurable number of missed CMMs, the terminal should consider the IPGW to no longer be available.

Figure 2:
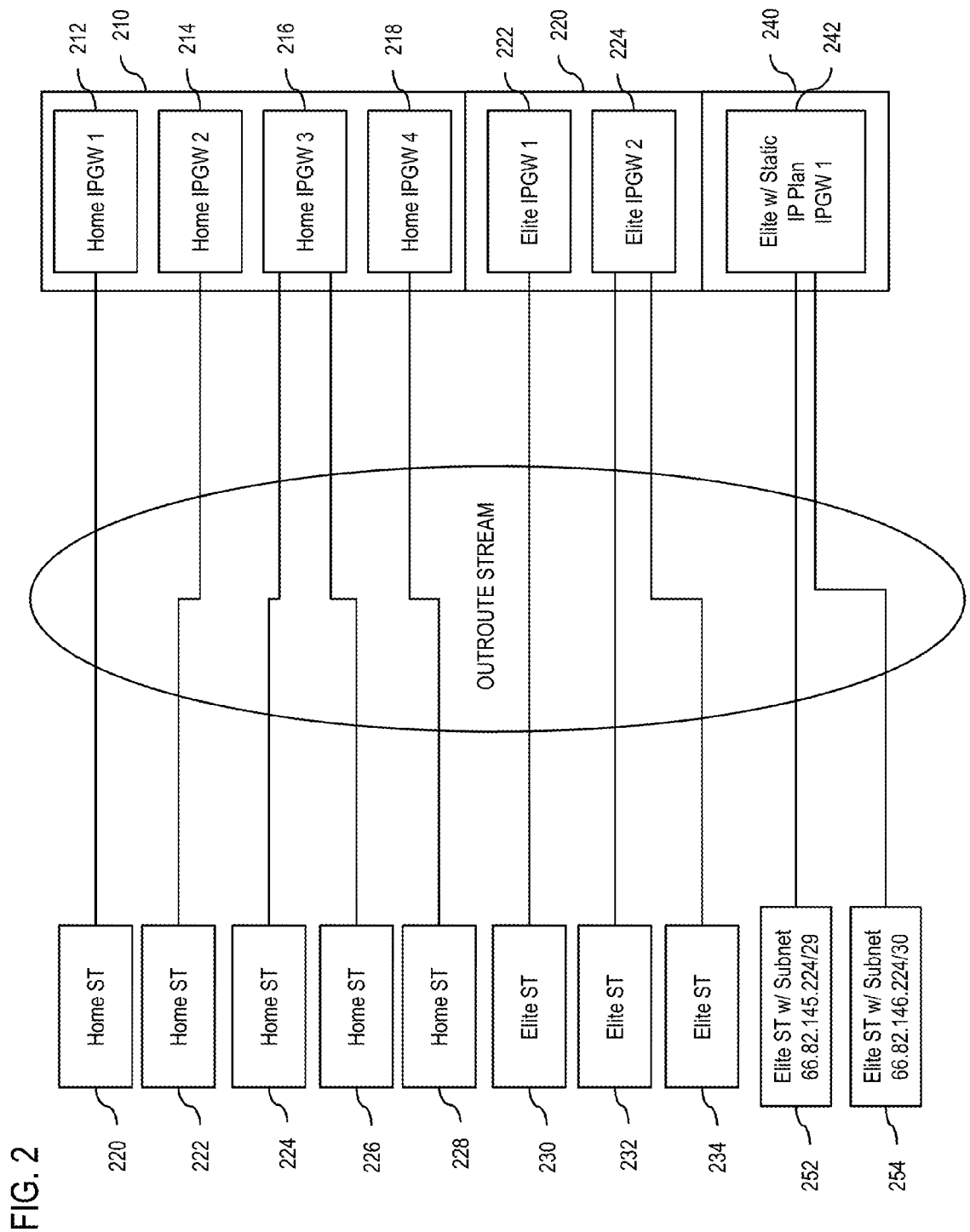
FIG. 2 illustrates a block diagram of an IPGW pool, in accordance with an exemplary embodiment.

As shown in FIG. 2, for example, an IPGW pool consists of 1 to N IPGWs. This example shows 3 different IPGW pools distinguished by service and by servicing static IPv4 subnets for terminals with static IPv4 subnet assignments. There is a home IPGW pool 210 consisting of home IPGWs 212, 214, 216, 218, which service the home STs 220, 222, 224, 226, 228—where home ST 220 is associated with home IPGW 212, home ST 222 is associated with home IPGW 214, home STs 224 and 226 are associated with home IPGW 216, and home ST 228 is associated with home IPGW 218. Then, there is an elite IPGW pool 220 consisting of the Elite IPGWs 222 and 224, which service the elite STs 230, 232, 234—where elite ST 230 is associated with elite IPGW 222, and elite STs 232 and 234 are associated with elite IPGW 224. Lastly, there is an elite with static IP plan IPGW pool 240 consisting of the elite with static IP plan IPGW 242—where the elite ST w/subnet (66.82.145.224/29) 252 and the elite ST w/subnet (66.82.146.224/30) 254 are associated with the elite with static IP plan IPGW 242. When a ST is associated, it is associated with a given IPGW within its pool, and over time, an ST can be associated with any of the IPGWs within the pool. Further, if the service capabilities/ subscription plan of an ST are upgraded or downgraded, then the ST would disassociate from its current IPGW, and associate with an IPGW of a pool of IPGWs appropriate for servicing the upgraded/downgraded services of the ST.

Terminals that are not currently associated select an IPGW from their matching IPGW pool. According to one embodiment, the selection is performed based on a weighted random selection algorithm as a function of the IPGW reported loading. In other words, terminals are more likely to attempt to Associate with an IPGW that is more lightly loaded (higher weight) than an IPGW that is more heavily loaded (lower weight). The definition of loading, for example, relates to the aggregate throughput of the IPGW, as described in further detail below. A terminal associates with an IPGW using a protocol. The terminal sends an association request to the IPGW containing the information that the IPGW needs to service it. This provides the IPGW with information such as the terminal data WAN IP address, the terminal download speed, and the terminal download usage. The security protecting this service information from being manipulated by the end user is called a Service Signature (described below). Upon performing a set of checks, the IPGW accepts or rejects the terminal association request. As part of acceptance, the IPGW assigns the terminal an IPv6 prefix and IPv4 private subnet. Once a terminal is associated with an IPGW, performance enhancing proxy backbones may be established for data flows between the terminal and IPGW.

Once associated with an IPGW, a terminal will tend to stay associated with the IPGW. A terminals may become disassociated from an IPGW, for example, due to: a) changes in terminal configuration that change the eligible IPGW pool; b) changes in IPGW configuration whereby the IPGW is no longer capable of satisfying the terminal service requirements; c) the terminal reboots; d) long lasting weather or terminal or gateway link failure conditions; e) IPGW failure or reporting of an inoperable state; and f) loading conditions of the IPGW. Terminals that fail to associate to any IPGW, fail to find a matching IPGW Pool or that are suspended may associate with an IPGW that provides Walled Garden services (described in further detail below), until the issues are resolved, and the terminal is able to associate with a normal IPGW.

Accordingly, embodiments of the present invention achieve several advantages in such shared bandwidth networks. One such advantage is that there is no need to download new configuration to terminals and IPGWs in the event of a gateway switchover. Whereas legacy systems require the download of static configuration to the terminals about their IPGW and to the IPGWs about the terminals, which leads to a large amount of configuration that would need to be downloaded mainly to the IPGW (e.g., an IPGW may serve thousands of terminals, and thus would requires specific configuration information for each one of them). By contrast, according to embodiments of the present invention, in the case of a GW or IPGW switchover, for example, all that would be required is a download of the capabilities configuration for the GW/IPGW and a key.

Another advantage is that it provides the capability of performing a certain level of dynamic load balancing. In legacy systems, large amounts of terminals are manually moved between IPGWs to better balance the load on GWs, where either there are a statistically large number of terminals or (more likely) a statistically more active set of terminals—again requiring manual configuration to achieve the terminal movements. By contrast, according to embodiments of the present invention, terminals are capable of dynamically switching IPGWs, to balance load, where the switch requires only a dynamic reassociation with another IPGW from the IPGW pool of the terminal.

A further advantage exists in the fact that terminals need not be tied to particular IP addresses. Thus, when a terminal disassociates, the terminal changes its IP address as well (with the exception of static IPv4/IPv6 plans). This provides for flexibility in IP Address Assignment, and alleviates design complications associated with assignment of public IP addresses to terminals.

Figure 7:
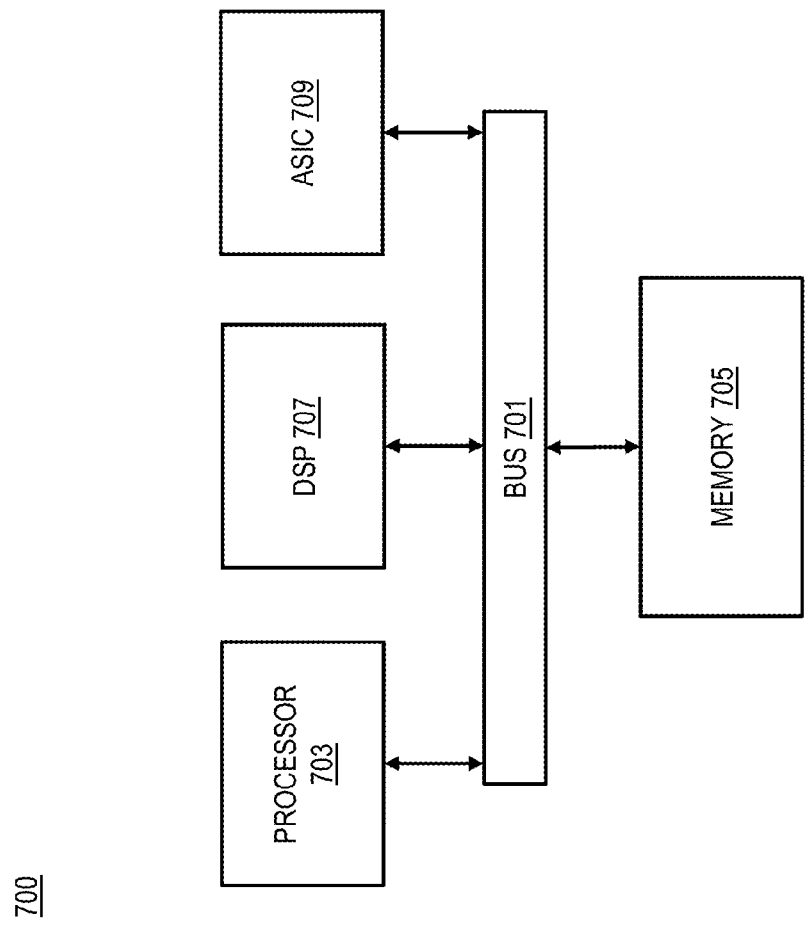
FIG. 7 is a diagram of a chip set that can be utilized in implementing architectures and methods for association of remote nodes with respective aggregation nodes, according to exemplary embodiments.

The architectures and methods for association of remote nodes with respective aggregation nodes, according to exemplary embodiments of the present invention, can be implemented, at least in part, by one or more chip sets, including one or more processors and memory, as illustrated in FIG. 7 (showing one such processor). The chip set 700, for example, is incorporated into the STs and/or GWs/IPGWs, and as such, the chip set 700 provides a means for accomplishing various parts of the algorithms and protocols herein described and illustrated. Further, different aspects of such algorithms and protocols may be allocated to the components of the chip set, as would be prudent based on design choices that would be apparent to one of skill in the art.

FIG. 3A depicts a flow chart illustrating an ST algorithm for creation of an IPGW pool, in accordance with an exemplary embodiment. Additionally, this algorithm also applies to the addition and deletion of an IPGW to or from an existing IPGW pool of an ST, based on the current CMM being analyzed by the ST. The algorithm starts at Step 302, where the ST receives and decodes a CMM. At Step 304, the ST determines (e.g., based on the IPGW ID) whether the IPGW from which the CMM was received is already in the IPGW pool of the ST. If the IPGW is already in the IPGW pool of the ST, at Step 306, the ST determines whether the Change Sequence Number of the IPGW has changed since the last CMM of the IPGW. If the ST determines that the Change Sequence number has not changed, then the ST simply updates the IPGW and load information in the current IPGW pool of the ST (Step 308), and the algorithm advances to Step 310, where the ST awaits receipt of a next CMM (e.g., a CMM from another IPGW or a next CMM form the same IPGW). Moreover, if the ST is associated to this IPGW, the terminal also checks the Last Reboot Timestamp and considers itself unassociated if the Last Reboot Timestamp is more recent than the last association time (as described above). At Step 310, if the ST is currently unassociated, the terminal only waits until a CMM Message Timer (e.g., cmmMsgCollectionTimer) expires (Step 336), before it proceeds to Step E, and runs the IPGW Selection Algorithm. At Step 304, if the ST determines that the IPGW is not currently in the IPGW pool of the ST, then the algorithm advances to Step 312. Also, at Step 306, if the ST determines that the Change Sequence Number has not changed since the last CMM of the IPGW, then the algorithm advances to Step 312. At Step 312, based on the IPGW service status indicator, the ST determines whether the IPGW is in service. If the IPGW is not in service, then the algorithm advances to Step 310, where the ST waits to receive another CMM (subject to the CMM Message Timer determination of Step 336, if the ST is unassociated). If, however, the IPGW is in service, the algorithm advances to Step 314. Alternatively, the ST determines that the IPGW is operating in a degraded service state (not shown in FIG. 3), and (depending on the level of degradation) the ST determines that the IPGW is still sufficiently operational (where the algorithm would advance to Step 314), or that the IPGW is not sufficiently operational (where the algorithm would advance to Step 310).

At Step 314, the ST determines whether the IPGW provides a walled garden service level. A walled garden service refers to a service that provides only a set of limited capabilities. Scenarios where an ST would be limited to a Walled Garden include, for example, ST configuration or other problems that block normal IPGW association, service suspension, and service activation. For example, service suspension reflects a state usually employed when a subscriber has failed to pay their service bills, or for a limited period after a subscriber suspends their service. The permitted access capabilities of a Walled Garden service are set based on particular business considerations, which, for example, are limited essential services, such as web email services, service provider customer service web sites, and business support systems. Further, a walled garden service will generally prohibit general web access. The walled garden scenario, for example, is intended to be a temporary service configuration, to provide essential services, while the subscriber addresses the issues that prompted the walled garden scenario. If the ST determines that the IPGW supports a walled garden service, then the ST adds the IPGW to a walled garden pool, and advances to Step 310, where the ST awaits a next CMM (subject to the CMM Message Timer determination of Step 336, if the ST is unassociated).

If the ST determines that the CMM of the IPGW does not indicate a walled garden service, then the ST determines whether the services supported by the IPGW match or support the service configuration and subscriptions of the ST (Step 316). For example, the ST analyzes the capability set specified by the CMM, and determines whether the desired services for which the ST is configured, and to which the ST is subscribed, are supported by the capabilities of the IPGW. For example, in accordance with an exemplary embodiment, based on the services for which the terminal is configured (e.g., the services to which a user of the terminal has subscribed), the terminal utilizes one or more quantitative service criteria extracted from the CMM for determining whether the IPGW supports the required services of the ST. For example, download throughput and download volume usage policy represent two such quantitative service criteria.

The download throughput reflects the maximum speed (in Mbps) which a terminal is configured to sustain in the receive direction from the network, for user data. The download throughput, for example, is based on the service plan to which the terminal is subscribed (e.g., based on the user service subscriptions). The download usage volume reflects the amount of data in MB or GB that a terminal is configured to receive from the IPGW in the download direction. The download usage volume, for example, is based on an option selected by the user when signing up for a service plan.

If the ST determines that the IPGW does not support the service configuration and subscriptions of the ST, then the algorithm advances to Step 310, where the ST awaits a next CMM (subject to the CMM Message Timer determination of Step 336, if the ST is unassociated). If, however, there is a match between the service capabilities of the IPGW and the configuration/subscriptions of the ST (e.g., the IPGW satisfies the requirements of the ST), then the algorithm advances to Step 320. At Step 320, if the terminal is an ST subscribed to a static IPv4, then the algorithm advances to Step 324, otherwise the algorithm advances to Step 322. At Step 324, the ST determines whether the IPv4 subnet of the ST is in the CMM, and, if not, then the algorithm advances to Step 310, where the ST awaits a next CMM (subject to the CMM Message Timer determination of Step 336, if the ST is unassociated). Otherwise, if the IPv4 subnet is in the CMM, then the algorithm advances to Step 322. At Step 322, the IPGW is added as a candidate IPGW in the IPGW pool of the ST (e.g., ipgwPool).

Figure 3B:
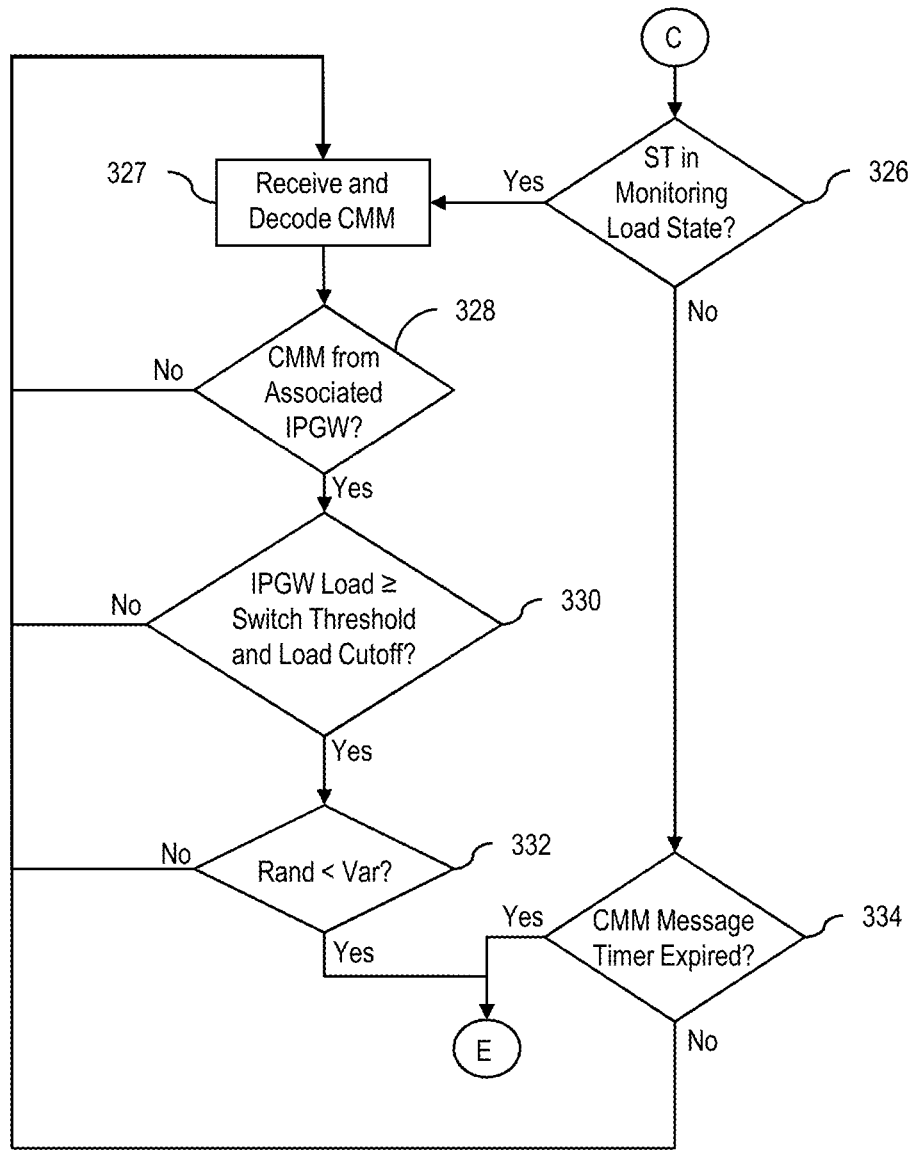
FIG. 3B depicts a flow chart illustrating an algorithm whereby a currently associated ST may determine to disassociate from the current IPGW and associate with a new IPGW, in accordance with an exemplary embodiment.

FIG. 3B depicts a flow chart illustrating an algorithm whereby a currently associated ST may determine to disassociate from the current IPGW and associate with a new IPGW, in accordance with an exemplary embodiment. Referring back to FIG. 3A, for example, after an ST adds an IPGW to the IPGW pool of the ST (Step 322), the ST begins the algorithm of FIG. 3B to determine whether to associate with a new IPGW. First, at Step 326, it is determined whether the ST is in a Monitoring Load state (described below with respect to FIG. 4A). If the ST is in the Monitoring Load state, then the algorithm advances to Step 327, where the ST receives and decodes a CMM. Next, at Step 328, the ST determines whether the CMM is from the IPGW currently associated with the ST, and if so, then the ST proceeds to determine whether to associate with a different IPGW, beginning with Step 330. At Step 330, the ST determines whether the load of the associated IPGW (e.g., currIPGWLoad) exceeds a minimum threshold (e.g., switchIPGWThreshold) and also exceeds the cutoff load (e.g., Load_Cutoff) of the IPGW. If the answer at Step 330 is yes, then the algorithm advances to Step 332, and the ST randomly decides whether to attempt to associate with a different IPGW. If the answer at either of Steps 328, 330 or 332 is no, then the algorithm advances back to Step 327, where the ST receives and decodes a next CMM. If, at Step 334, it is determined that the CMM message timer has expired, or, at Step 332, the result of the determination is yes, then the ST will select a new IPGW (from the IPGW pool) with which to associate. For example, the ST would run the IPGW selection algorithm of FIG. 3C.

According to one exemplary embodiment, for Steps 330 and 332:

$$\text{Load\_Cutof} = \text{max\_Load\_IPGW\_Pool} - \left\{ \frac{\text{Load\_Cutoff\_Percentage}}{100} * [\text{max\_Load\_IPGW\_Pool} - \text{min\_Load\_IPGW\_Pool}] \right\}$$

$$\text{Rand} = \text{random value between 0 and 1}$$

$$\text{Var} = 10^{((currIPGWLoad-MAX\_IPGW\_Load)/10)}$$

Figure 3C:
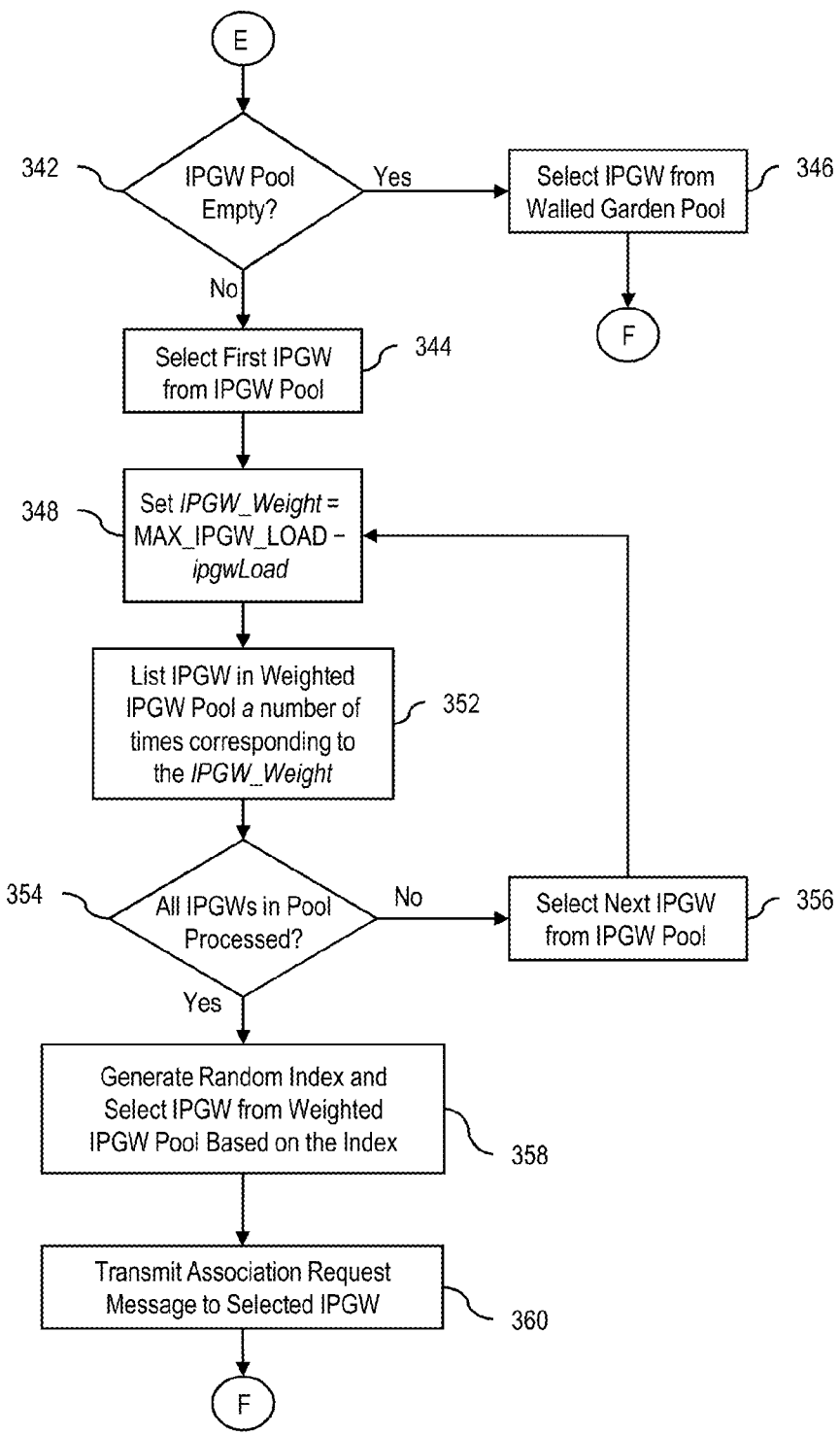
FIG. 3C depicts a flow chart illustrating an IPGW selection algorithm whereby an ST selects an IPGW from the IPGW pool of the ST, in accordance with an exemplary embodiment.

FIG. 3C depicts a flow chart illustrating a weighted random selection algorithm whereby an ST selects an IPGW from the IPGW pool of the ST, in accordance with an exemplary embodiment. The algorithm starts at Step 342, where the ST determines whether its IPGW pool is empty, and, if empty, then the algorithm advances to Step 346, where the ST selects an IPGW from a Walled Garden IPGW pool. This assumes that at least one Walled Garden IPGW is configured per spot beam (and that the ST has successfully added the IPGW to a Walled Garden IPGW pool (e.g., pursuant to the algorithm for creation of an IPGW pool of FIG. 3A). Further, the selection process for selecting a particular IPGW from the Walled Garden IPGW pool may be similar to the selection algorithm for a regular IPGW, as set forth below.

This next part of the algorithm determines an integer weight for each active IPGW in the IPGW Pool, where the integer weight is inversely proportional to the load. In other words the higher the load of an IPGW, the lower the weight. As described above, according to one embodiment, the reported load of an IPGW consists of an integer ranging from one to MAX_IPGW_LOAD, where MAX_IPGW_LOAD reflects the maximum load and one reflects the minimum load. At Step 342, if the IPGW pool is determined as not being empty, then the algorithm advances to Step 344, where the ST selects the first IPGW from within the IPGW pool. At Step 348, the weight for the selected IPGW is set at the MAX_IPGW_LOAD minus the reported load of the selected IPGW (e.g., ipgwLoad, as stored with respect to the IPGW in the IPGW pool). Accordingly, this sets the weight of a particular IPGW as being the difference between its reported load and the maximum load—setting the weights at an inverse relative to the reported load and the maximum load. For example, on a load scale of 1 to 100, if an IPGW has a load of 10 (a relatively low load), then the weight of that IPGW will be set at 90, whereas, if an IPGW has a load of 80 (a relatively high load), then the weight of that IPGW will be set at 20. At Step 352, a weighted IPGW pool is generated by listing the IPGW to the weighted IPGW pool a number of times corresponding to its IPGW weight (from Step 348). Accordingly, from the foregoing examples, the IPGW of weight 90 will be listed in the weighted IPGW pool 90 times, and the IPGW of weight 20 will be listed in the weighted IPGW pool 20 times. Next, at Step 354, the ST determines whether all IPGWs of the IPGW pool have been processed (e.g., have been weighted and listed in the weighted IPGW pool accordingly). If not, the algorithm advances to Step 356, where the next IPGW is selected from the pool, and then the Steps 348 and 352 are repeated to weight that next IPGW and list it in the weighted IPGW pool according to its weight. Once all the IPGWs of the IPGW pool are processed (a Yes condition at Step 354), a random index (between 1 and the length of the weighted IPGW pool)

is generated to randomly index the weighted IPGW pool and select an IPGW with which the ST is to associate (Step 358). Lastly, once an IPGW has been selected, the ST would then execute the algorithm for associating with the selected IPGW (FIG. 3D).

Accordingly, the foregoing algorithm for selecting an IPGW from the IPGW pool of an ST reflects an algorithm that operates based on a statistical probability for selecting a less loaded IPGW more often than a more loaded IPGW. Moreover, while this algorithm reflects a specific algorithm according to one embodiment, it will, however, be evident that various modifications and changes may be made thereto, and additional embodiments may be implemented, without departing from the broader scope of the present invention. For example, an alternative embodiment might encompass the implementation of Cumulative Probability Distribution (CPD) table.

Figure 3D:
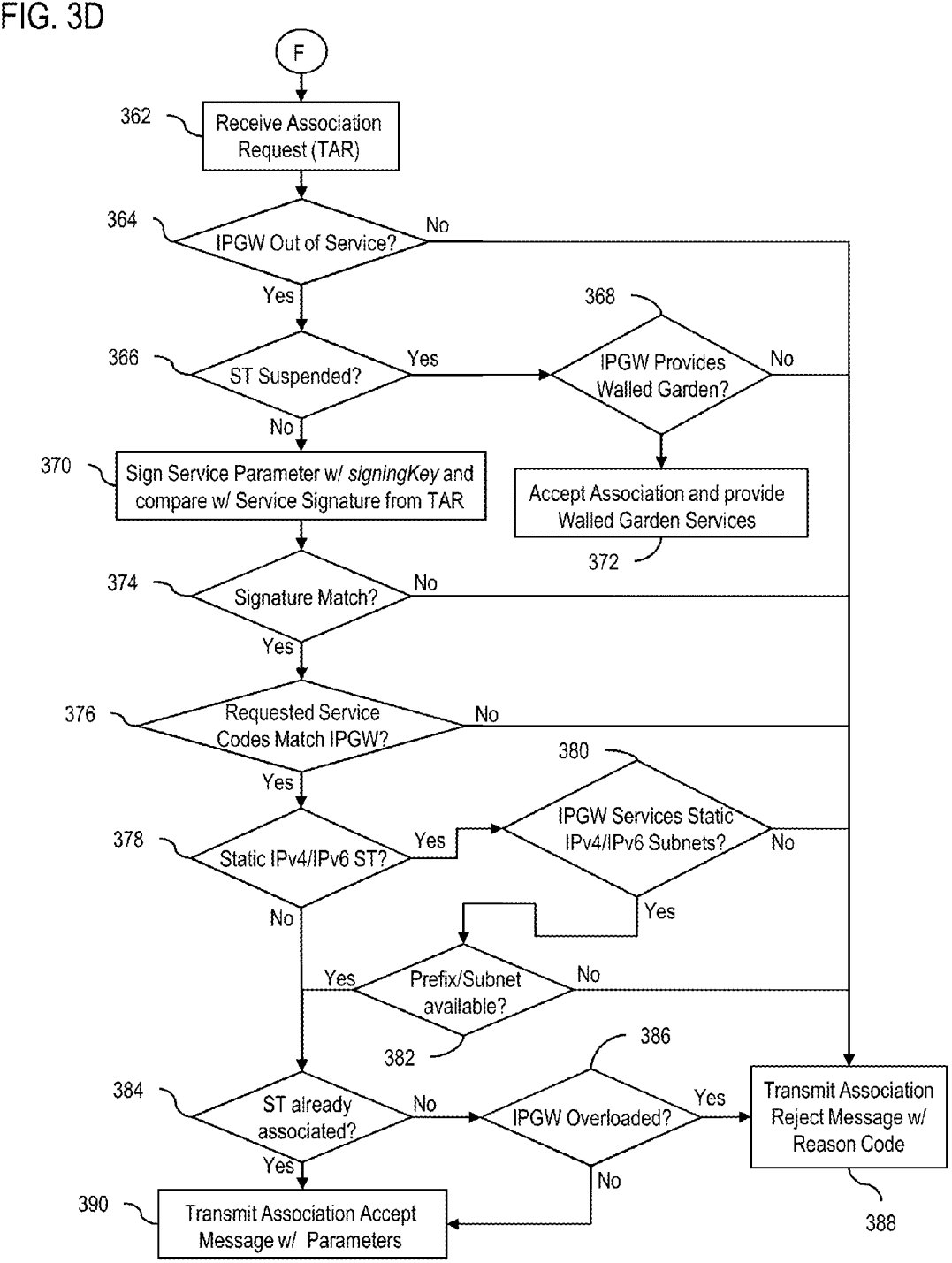
FIG. 3D depicts a flow chart illustrating an IPGW association algorithm, in accordance with an exemplary embodiment.

FIG. 3D depicts a flow chart illustrating an IPGW association algorithm whereby an ST associates with an IPGW selected from the IPGW pool of the ST, in accordance with an exemplary embodiment. Referring to FIG. 3C, once an ST selects an IPGW from its IPGW pool (Step 358), the ST transmits a terminal association request message (e.g., the TAR message) to the IPGW (Step 360). The TAR message is a unicast message to the particular IPGW selected by the ST with which to associate. The TAR message, for example, contains various elements of information, such as service information related to the ST configuration, where contents of the service information include, for example, a Device ID and Customer ID, where the Device ID serves as a unique terminal identifier to track download usage of the ST, and the Customer ID serves as a unique identifier for the customer associated with the ST. The TAR message also contains an identifier indicating the download throughput and the download usage volume configuration or service subscription of the terminal, and an identifier specifying the service state of the terminal (e.g., suspended or unsuspended). When an ST is suspended, the terminal associates only with IPGWs reporting support of Walled Garden services. The TAR message further contains a service signature, which consists of a signed version or hash of the service parameter information. The service signature serves to protect against tampering with the service parameter information in an attempt to upgrade the service plan(s) of the ST over and above the service plans to which the ST is subscribed. Further, in the case of an ST subscribed to a static IPv4 or IPv6 subnet service, the TAR message will also include the IPv4 or IPv6 subnet information.

The association algorithm begins at Step 362, where the IPGW receives the TAR message from the ST, which (as specified above) includes the service parameter information and the service signature for the ST. Initially, the IPGW checks that its status is not out of service (Step 364). Once the IPGW verifies that it is in service, it checks the status of the ST to ensure that the ST is not in a suspended state (Step 366). If the ST is in a suspended state, then the IPGW determines whether it provides a Walled Garden service (Step 368), and, if so, then the IPGW accepts the association, and limits the ST to only Walled Garden services (Step 372). For example, Walled Garden IPGWs must accept the association request irrespective of the ST state and service plan. At Step 366, if it is determined that the ST is not in a suspended state, then the IPGW signs the ST service parameters (extracted from the TAR) with the service signature key (e.g., the signingKey preconfigured in the IPGW)(Step 370), and compares the signed service parameters against the service signature of the ST (extracted received via the TAR message) (Step 374). At Step 374, if there is a signature match, then the algorithm advances to Step 376, where the IPGW determines whether the requested services match the service capabilities of the IPGW (whether the service parameters of the ST match the service parameters of the IPGW). Once the IPGW determines that the requested services match the capabilities of the IPGW, the IPGW determines whether the ST is subscribed to a static IPv4 or IPv6 subnet (Step 378). If the ST is subscribed to a static IPv4 or IPv6 subnet, the IPGW services IPv4/IPv6 subnets and the prefix/subnet is available through the IPGW (Steps 380 and 382), then the algorithm advances to Step 384. At Step 384, the IPGW determines whether the ST is already associated with the IPGW, and if so, at Step 390, the IPGW accepts the association and sends an association accept message to the ST, accepting the association and providing the appropriate parameters. Otherwise, if the ST is not associated with the IPGW, then the IPGW determines whether it is overloaded (Step 386). If the IPGW is not overloaded, at Step 390, the IPGW accepts the association and sends an association accept message to the ST, accepting the association and providing the appropriate parameters. Included with the association accept message, for example, the IPGW provides the following parameters: assigned IPv6 prefix and subnet size, the private IPv4 subnet and subnet size, where a private IPv4 subnet may always be sent even if the terminal subscribes to a static IPv4 plan. If the IPGW determines that it is not in service (No at Step 364), the IPGW does not support Walled Garden Services (No at Step 368), there is a signature mismatch (No at Step 374), the IPGW determines that the service codes do not match the capabilities of the IPGW (No at Step 376), the IPGW does not service static IPv4/IPv6 subnets (No at Step 380) or the prefix/subnet is not available (No at Step 382), or the IPGW is overloaded (Yes at Step 386), then the algorithm advances to Step 388, where the IPGW sends an association reject message to the ST, rejecting the association and providing a rejection reason code.

According to an exemplary embodiment, the association response is a unicast message, which is transmitted by the IPGW, in response to an ST association request message, to the particular ST from which the TAR message originated. The association response comprises either an association accept message or an association reject message depending upon the Response code returned by the IPGW in the message—either accepting the association request or rejecting the association request. For example, the association response contains a response code indicating whether the response is an association accept message or an association reject message. In the case of an association accept message, the association response may include an IP address assignment. In the case of an IPv6 subnet, the IP address assignment would include the IPv6 Prefix and Prefix Length, specifying the IPv6 prefix used to assign an IPv6 subnet to the terminal LAN port as well as to delegate other IPv6 subnets to routers on the customer network. The IP address assignment would also include the IPv4 subnet and subnet size, which is assigned to the terminal LAN port and can be used to assign DHCP addresses. The association response also includes the DNS Server IP addresses, which may be IPv4 and/or IPv6 addresses. Further, the sending of an association accept message also prompts the IPGW to open performance enhancing proxy (PEP) backbones with the terminal. While PEP and association are not generally dependent upon each other, there may be interactions between the required protocols before the ST can begin providing data plane services to the user. Further, every time the IPGW permits an association, the IPGW may send out a real-time, reliable notification containing the Device ID, the association start time, and any IP subnets assigned.

In the case of an association reject message, the response contains a reject cause code, where the reject cause code may be either permanent or temporary, which impacts the follow-up actions of the ST. The reject cause code, for example falls into two major categories. One such category reflects transitory problems (e.g., problems that tend to self-correct). Examples of transitory problems include a rejection due to the candidate IPGW changing to a non-active state, a rejection due to loading of the candidate IPGW, or a rejection due to running out of IP subnets for allocation to the terminal. The second category reflects fundamental problems, which are problems that are not likely to self-correct. Examples of fundamental problems include a rejection due to a signature mismatch, a rejection due to a protocol error, a rejection due to unsupported service parameters, or a rejection due to a suspend state mismatch. While a fundamental category may be transitory (e.g., signature mismatches while changing keys during a maintenance window), most require intervention. When the first IPGW rejects an ST, regardless of the reject type, the terminal selects a different candidate IPGW from the IPGW pool, if one is available. If the ST is rejected by more than one IPGW, based on a transitory reject code, the terminal continues to try all IPGWs in the IPGW pool until the terminal has tried all IPGWs at least once. If the ST has been rejected by all IPGWs in the pool (e.g., due to abnormally high loading), the terminal enters a Backoff state (e.g., if the ST has yet to enter the Backoff state during this association attempt). If the ST is rejected by more than one IPGW with a fundamental reject code, the terminal enters a Walled Garden state, where it can access customer care pages and basic services until the problem is corrected.

Figure 3E:
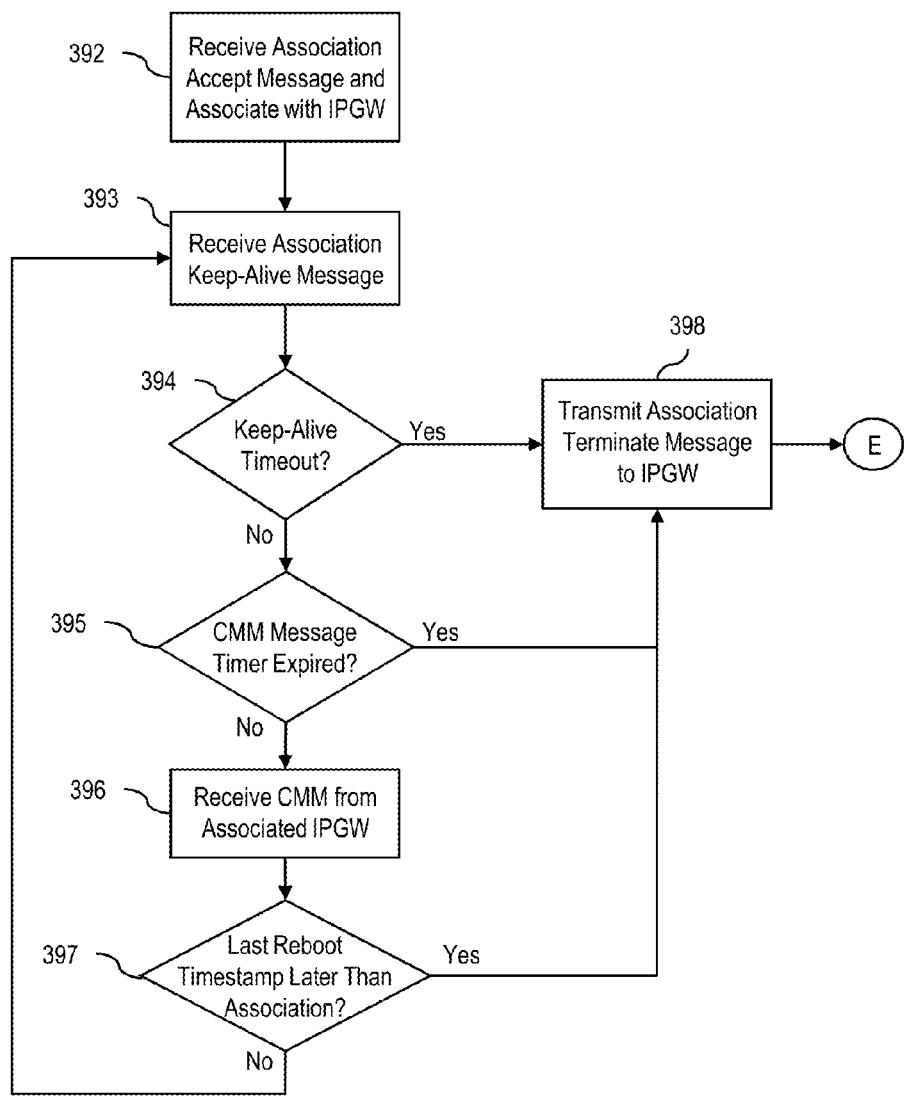
FIG. 3E depicts a flow chart illustrating an algorithm whereby an ST determines whether to terminate an association with an IPGW based on certain timeouts or an IPGW reboot, in accordance with an exemplary embodiment.

FIG. 3E depicts a flow chart illustrating an algorithm whereby an ST determines whether to terminate an association with an IPGW based on certain timeouts or an IPGW reboot, in accordance with an exemplary embodiment. An ST may perform the algorithm of FIG. 3E while either in the ST Associated state 430 (described below) or in the Monitoring Load state 432 (described below). Once the ST receives an association accept message from the IPGW to which it sent an association request message, the ST associates with the respective IPGW (Step 392). While associated, the ST will receive periodic keep-alive messages indicating that the association is still active (Step 393). Further, the ST monitors the timing of association keep-alive messages via a configurable predetermined keep-alive message timer, whereby the ST determines whether the keep-alive timer has expired before it receives a next keep-alive message (Step 394). The ST also monitors the timing of CMM messages from the IPGW with which it is associated, via a configurable predetermined CMM message timer, whereby the ST determines whether the CMM message timer has expired before it receives a next CMM message from its associated IPGW (Step 395). If (at Step 394) the ST determines that the keep-alive timer has expired before receiving the next keep-alive message, or that the CMM message timer has expired before receiving the next CMM from its associated IPGW (Step 395), then the ST concludes that the association is no longer active, and sends an association terminate message to the IPGW (Step 398), at which point the ST will select a new IPGW from its IPGW pool with which to associate (e.g., through the IPGW selection algorithm of FIG. 3C). If the CMM message timer has not expired, then the ST is receiving CMMs from its associated IPGW (Step 396), which include a last reboot timestamp indicating the time of the most recent reboot of the IPGW. The ST determines whether the time of the latest reboot of the IPGW is more recent than the time when the ST became associated with the IPGW (Step 397). If the ST determines that the latest reboot of the IPGW is more recent than the time of association, then the ST similarly concludes that the association is no longer active, and sends an association terminate message to the IPGW (Step 398), at which point the ST will select a new IPGW from its IPGW pool with which to associate (e.g., through the IPGW selection algorithm of FIG. 3C).

Figure 4A:
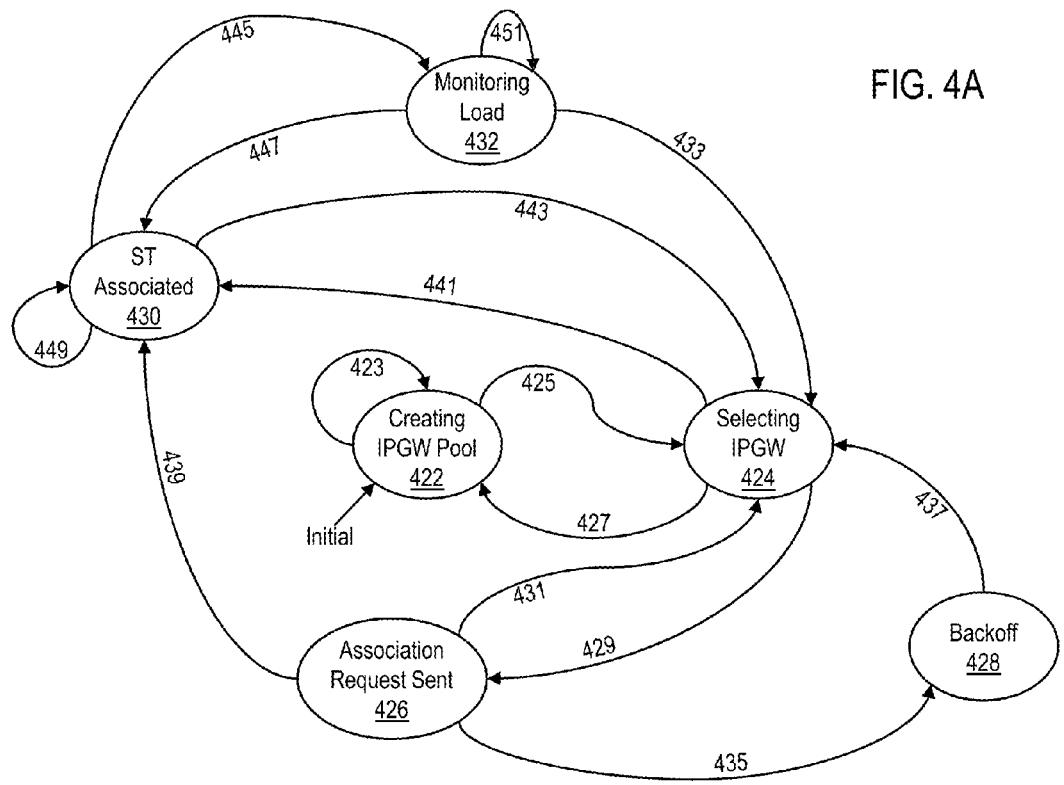
FIG. 4A depicts a state diagram illustrating the states of an ST, in accordance with an exemplary embodiment.

FIG. 4A depicts a state diagram illustrating the states of an ST, in accordance with an exemplary embodiment. The Creating IPGW Pool state 422 is the initial state in which an ST starts (e.g., after reboot). The ST may also enter this state for one of several reasons, including: (a) the terminal returns after an outage of the outroute stream, either due to a long lasting transmission impairment or a relatively long gateway failure; (b) the configuration of the ST changes such that the IPGWs of the current pool no longer satisfy the service requirements of the ST; or (c) the IPGWs of the current IPGW pool of the ST become no longer available to service the terminal (e.g., based on IPGWs going out of service or being reconfigured). In this state, the ST does not currently have an IPGW Pool. In states where the ST already has an IPGW pool, the terminal continually keeps its IPGW pool up to date, and thus the state Creating IPGW Pool state is not generally applicable to an ST that already has an IPGW pool, even if the terminal loses its association with an IPGW with which the ST is currently associated. In the case of relatively long outages and reboots, however, a terminal does not attempt to maintain its current state of an existing IPGW pool or current association. After a relatively long outage or reboot, therefore, the ST enters the IPGW pool creation state, as opposed to attempting to re-establish the prior IPGW pool and IPGW association from before the outage or reboot. Additionally, although a practical limit must be placed on the number of IPGWs that can be placed in the IPGW pool, exemplary embodiments of the present invention encompass a flexible design whereby an IPGW pool supports enough IPGWs such that there is operational flexibility in deploying large IPGW pools, while effectively load balancing across them. For example, in one exemplary embodiment, the ST is capable of supporting at least 64 IPGWs, allowing for potential future cases of load balancing across all outroute streams of all outroutes in a satellite beam (e.g., 172a-172n). The process for creation of the IPGW pool, for example, follows the algorithm of FIG. 3A.

According to one exemplary embodiment, an ST receives CMMs from all of active IPGWs utilizing a particular outroute stream (e.g., the receiving CMMs transition 423, conditioned on the ST receiving CMMs). The ST decodes and analyzes the CMMs to determine IPGW matches based on several criteria within the CMM. For example, the ST is configured with service parameter information, which comprises a set of parameters configured in the terminal to signify the service plan(s) to which the ST is subscribed. The ST matches its service parameter information against the capabilities reported through the CMM of each IPGW. The ST may also match against customer ID and software/hardware compatibility. Any IPGW whose CMM is not a match is ignored, and any IPGW whose CMM is considered a match, and that is reporting an in-service state, is added to the IPGW pool. Further, the ST monitors and filter CMMs for a configurable predetermined timeout period (e.g., based on a CMM collection timer) to ensure the terminal considers CMMs from all eligible IPGWs. Once the CMM collection timer has expired, the ST either has an empty IPGW pool or has a non-empty IPGW pool, and the ST transitions to the Selecting IPGW state 424 (e.g., the transition 425, conditioned on expiration of the Collection Timer).

Additionally, the ST may also enter the Selecting IPGW state 424, for example: (a) if the ST determines to associate with a new IPGW, while in the Monitoring Load state 432 (e.g., the transition 433, conditioned on the IPGW Load being higher than average); (b) from the Association Request Sent state 426, if the ST fails to associate with a candidate IPGW (e.g., the transition 431, conditioned on expiration of a response timer a predetermined number of times or on receipt of an association reject response message); or (c) from the ST Associated state, if the ST loses connectivity or fails to get connectivity to an IPGW with which it was associated (e.g., the transition 443, conditioned on a predetermined number of missing keep-alives (a keep-alive timeout), receipt of an association termination, failure to receive CMM messages from associated IPGW, or Last Reboot Timestamp after association with IPGW). Further, the ST may exit the IPGW Selection state in either of the following scenarios: (i) the ST selects the IPGW with which it is already associated and transitions directly to the ST Associated state 430 (e.g., the transition 441, conditioned on selection of associated IPGW); (ii) the ST sends an association request message to a candidate IPGW, and transitions to the Association Request Sent state 426 (e.g., transition 429, conditioned on selection of an IPGW); or (iii) the IPGW pool of the ST is empty, prior to sending an association request message, whereby the ST transitions to the Creating IPGW pool state 422 (e.g., transition 427, conditioned on an empty IPGW pool).

In the Selecting IPGW state 424, the ST, for example, uses a random selection algorithm to select a single candidate IPGW from the IPGW Pool. First, if the ST has an empty IPGW pool, the terminal resets a timeout period and transitions back to the Creating IPGW Pool state 422 (e.g., the transition 427). The ST cycles through this loop for up to a configurable predetermined number of times. If the terminal is operational and has not matched at least one IPGW for a number of timeout periods, the terminal then attempts to select an IPGW serving a Walled Garden service (described below). If the ST attempts to associate with a Walled Garden IPGW and either fails to find any Walled Garden IPGWs or is rejected by the Walled Garden IPGWs, the terminal continues to attempt to look for and associate with a Walled Garden IPGW until a change occurs that would prompt the terminal to re-attempt with a normal IPGW. In the Selecting IPGW state 424, the process for selection of the IPGW, for example, follows the algorithm of FIG. 3C.

According to an exemplary embodiment, when entering the IPGW Selection state 424, the ST sets one or both of two random timers before running the selection algorithm. The timers depend upon whether the ST is active or idle. If the ST is active (e.g., the terminal has traffic), then it sets a shorter timer (e.g., Active_Startup_Backoff) randomly selected between zero and a configurable predetermined maximum value of the timer, and, at the expiry of this timer, the terminal selects an IPGW and sends the association request message. If the ST is idle (e.g., the terminal does not have any traffic), it sets two timers, the Active_Startup_Backoff timer and a longer timer (e.g., Idle_Startup_Backoff) between the Active_Startup_Backoff timer and a configurable predetermined maximum value. If traffic arrives before the Active_Startup_Backoff timer has expired, then the terminal selects an IPGW and sends the association request message at the expiry Active_Startup_Backoff. If traffic arrives after the Active_Startup_Backoff timer has expired, then the terminal selects an IPGW and sends the association request immediately. If no traffic arrives, then the terminal selects an IPGW and sends the association request at the expiry Idle_Startup_Backoff. This process is used to spread out requests especially during gateway startup.

Once the ST has selected a candidate IPGW, the ST sends an association request message to the selected IPGW, and transitions to the association request Sent state 426 (e.g., the transition 429), where the terminal awaits a response. Once the association request message is sent, the ST starts a configurable predetermined timer (e.g., Waiting for Association Response timer), and, if the timer expires before a response is received, then the terminal retries the association request to the same candidate IPGW for up to a configurable predetermined amount of times. If the timer expires the predetermined amount of times without receiving a response, then the ST transitions back to the Selecting IPGW state 424 to select a different candidate IPGW (e.g., the transition 431). Note that the configurable amount of times can be set to 0, such that a new candidate IPGW will always be selected when there is no response to the association request within the timeout period. Further, if the ST receives an association reject response message, then the ST transitions back to the Selecting IPGW state 424 to select a different candidate IPGW (e.g., the transition 431). Additionally, if the ST attempts to associate with all IPGWs in the Pool without receiving an association accept response message, then the terminal enters a Backoff state 428 (e.g., the transition 435, conditioned on all IPGWs of pool not accepting or rejecting association).

An ST enters the Backoff state 428 based on being rejected by all IPGWs in the IPGW pool due to a transitory reject reason. This occurs, for example, when all IPGWs in the IPGW pool are maximally loaded. In order to reduce the amount of traffic from terminals that are being rejected, the terminal goes into a longer backoff period before attempting to reassociate. The terminal stays in this backoff state until the expiry of a backoff timer. At that time, the terminal transitions back into the Selecting IPGW state 424 and attempts again to select and associate with IPGWs in its IPGW pool (e.g., the transition 437, conditioned on expiration of the Backoff Timer). If the terminal has failed to associate after one time through the Backoff state, the terminal attempts to associate with the Walled Garden. If the terminal attempts to associate with a Walled Garden IPGW and is rejected, the terminal attempts to associate with another Walled Garden IPGW (if available within a Walled Garden IPGW pool of the ST). If the terminal is not receiving any Walled Garden IPGW CMMs or is not receiving any Walled Garden IPGW CMMs from a Walled Garden IPGW that has not rejected the terminal with a permanent rejection code, the terminal continues to look for Walled Garden CMMs until conditions change that allow the terminal to associate with an IPGW in its normal IPGW pool. If there are no other Walled Garden IPGWs, and the terminal has been rejected by a Walled Garden IPGW with a transitory reject reason, the terminal continues to use the backoff period to continue to attempt to associate with that Walled Garden IPGW until another Walled Garden IPGW starts reporting a CMM, the terminal successfully associates, or conditions change allowing the terminal to associate with an IPGW in its normal IPGW pool.

Once the ST receives an association accept message, the ST transitions to the ST Associated state 430 (e.g., the transition 439, conditioned on receipt of an Association Accept response message). In this state, the ST begins sending and receiving user UDP or TCP traffic. In one exemplary embodiment, however, the TCP connections are spoofed, and thus the terminal must ensure that the performance enhancing proxy (PEP) backbone connections are established with the new IPGW before the ST accepts TCP connections that are to be enhanced via a PEP. While in the Terminal Associated state, and once the PEP backbone connections are successfully established, the ST indicates such along with the identifier of the IPGW to which it is associated on its web user interface.

While in the ST Associated state 430, the ST periodically receives keep-alive messages, indicating that the association is still active, and also continues receiving and monitoring CMMs (e.g., transition 449). Whenever the ST determines that a configurable number of keep-alives have been lost, the ST considers the association to be terminated, and sends an explicit association terminate message to the IPGW. Similarly, if the ST determines that a CMM message timer has expired before receiving a next CMM from its associated IPGW, then the ST considers the association to be terminated, and sends an explicit association terminate message to the IPGW The association terminate is a unicast message sent from a particular terminal to a particular IPGW when that terminal is associated with that IPGW. This provides a clean and fast clean-up of state when the terminal is re-associating with a different IPGW or terminating its association for some other reason. The Terminate message contains a Reason Code, providing the reason the terminal is disassociating with the IPGW, which can be used in association logs for debugging and trending. The ST may also disassociate with the IPGW when the terminal fails to receive several CMM messages from the associated IPGW. There may also be a case where the ST does not lose enough CMM messages (e.g., due to a quick reboot of the IPGW). Accordingly, in order for the ST to not need to wait for the keep-alive timeout in this case, the terminal also looks at the Last Reboot Timestamp in CMM messages it receives from the Associated IPGW. If the Last Reboot Timestamp is after the time at which the terminal associated with the IPGW, the terminal disassociates with the IPGW. Accordingly, for such cases of a termination of the association or disassociation, the ST transitions back to the Selecting IPGW state 424 (e.g., the transition 443). In such cases, the terminal sends an association terminate message to the associated IPGW in order to cleanly disassociate, with no attempt to acknowledge or guarantee its delivery (because there is no guarantee that the IPGW will receive the termination message. The IPGW simply times out the ST if it has not received an association terminate message prior to a keep-alive timeout.

Further, while in the ST Associated state 430, the ST monitors its traffic to determine its idle/active status, and, when idle for a configurable predetermined time period (e.g., based on an Idle_Timer), the terminal transitions to the Monitoring Load state 432 for dynamic load balancing (e.g., the transition 445, conditioned on an Idle_Timer timeout). An ST, for example, is in an idle state when, for a predetermined period of time, no data has been transferred between the terminal local area network (LAN) interface (e.g., the network interface of an ST 134a-134n servicing the respective hosts 144a-144n or routers 154a-154n) and the ST air interface (e.g., the RF interface that communicates with the satellite 132 over the satellite channel 114). In one embodiment, the predetermined time period comprises a configurable time period programmable in the configuration of the ST. Further, the ST may be in an idle status when no TCP sessions are currently being spoofed (e.g., including any long-lived connection between a web acceleration client and the respective web acceleration server. On the other hand, an ST may be in an active state when, within the predetermined period of time, data has been transferred between the ST LAN and air interface, or at least one TCP session is actively being spoofed. According to one exemplary embodiment, an ST will reassociate only when in an idle state (because reassociating while active may be disruptive to data traffic), and thus (because the ST is idle) the reassociation of an idle terminal to a new IPGW does not immediately impact the load on that IPGW. Then, while in the Monitoring Load state 432, the ST transitions back to the ST Associated state 430 if data arrives via the LAN or air interface causing the terminal to go back to the active state (e.g., the transition 447, conditioned on an ST return to active state).

The Monitoring Load state 432 shares similar characteristics to the ST Associated state 430, in that the ST continues to exchange and monitor keep-alive messages with its associated IPGW and continues to monitor the receipt of CMMs from that IPGW (e.g., transition 451), and, if either the keep-alive messaging or the CMM messaging times out, then the ST sends an association terminate message to the IPGW. Further, the ST continues to monitor and update the IPGW pool information per the received CMMs (e.g., transition 451). In addition, while in the Monitoring Load state 432, the ST uses the current load information regarding the IPGW pool to determine whether a large load difference arises between the IPGW with which the terminal is currently associated and the other IPGWs in the IPGW Pool. If there is a relatively large load difference, and the load of the current IPGW is above a minimum configurable predetermined threshold, then the ST randomly determines whether to attempt to associate with a different IPGW. If the ST determines that it is going to attempt to associate with a different IPGW, the ST transitions to the Selecting IPGW state 424 to select a new candidate IPGW (e.g., transition 433). The ST performs such a determination based on the Load Cutoff and an associated algorithm performed each time the ST receives a new CMM from its associated IPGW (described below). Further, under such conditions where it is determined that an ST is eligible to reassociate based on the load of the IPGW, the algorithm applies a random determination as to whether or not to in fact reassociate, which ensures that not all such terminals leave the IPGW causing too dramatic of a load shift.

Moreover, while the foregoing discussion addresses reassociation of an ST when in an idle state, according to a further exemplary embodiment, the same principles may be applied to an ST when in an active state. For example, the ST may transition into the Monitoring Load state 432, and perform dynamic load balancing, irrespective of whether the ST is idle or active. Then, as provided above, the ST monitors loading of the IPGW with which it is associated, and determine whether or when it becomes a candidate for reassociation.

According to an exemplary embodiment, dynamic load balancing is performed across IPGWs through a randomization of ST and IPGW association, based on one or more metrics that are used to determine the ability of an IPGW to service the terminals currently associated to it, along with new terminals requesting association with the IPGW. While in the Creating IPGW Pool state 422, the ST creates an initial pool of IPGWs with their respective loads. The available IPGWs and the load and state of those IPGWs, however, may change over time. An ST, therefore, updates the load information for each IPGW in its pool every time that a new CMM is received from a one of the IPGWs within the pool. For example, according to one embodiment, dynamic load balancing is performed based on loading across the outroutes of the IPGWs. The implementation of load balancing based on IPGW outroute throughput, for example, achieves various advantages. Some such advantages include the fact that asymmetry ratios in internet networks lead to congestion, from the IPGW perspective, on outroutes as opposed to inroutes, so measurement based on the outroute achieves more accurate load measurements and improved congestion avoidance. Further, when the associated number of terminals is a more static figure, two gateways with similar numbers of associated terminals can evidence different throughput and congestion characteristics. Moreover, measuring load based on other parameters, such as the number of active terminals, reflects throughput and congestion, however, measurement of the load based on the throughput itself is more direct, and hence, again leads to more accurate load measurements and improved congestion avoidance. Alternatively, measuring load based on CPU utilization may be misleading, especially considering situations where multiple IPGW instances are utilized. Also, in a situation where an IPGW is configured to support a low committed information rate (CIR), the IPGW may be congested relative to that CIR, even though not congested based on CPU utilization, and thus measurement of load based on throughput is again more accurate.

The IPGW constantly measures its current load based on current throughput (transmission in Mbits/second), and converts that throughput number to a scale relative to the bandwidth that it is allowed to utilize. The IPGW uses a scale ranging from 0 to a configurable parameter (e.g., MAX_IPGW_LOAD) to measure the current load for reporting to the STs via its CMMs (e.g., MAX_IPGW_LOAD=100). A zero throughput or load value means that the IPGW has no user load and 100 means that the IPGW has reached a maximum load threshold (e.g., maxLoadThreshold). For example, the maximum load threshold is a function of the IPGW committed information rate (CIR) (e.g., configured on the IPGW), and an adjusted committed information rate (Adj_CIR), where the adjusted committed information rate potentially is lower than the committed information rate during times of flow control. For example, the IPGW uses the following function to calculate the value of each unit on the scale (e.g., Load_Unit, where the Load_Unit is the load value for every unit in the scale):

maxLoadThreshold=min(CIR,Adj_CIR)

Load_Unit=maxLoadThreshold/100

Once the scale is defined, the IPGW starts reporting its load (e.g., ipgwLoad) in the CMM. To determine the scale, the IPGW first converts the current smoothed load to a Load Scale Index (e.g., loadIndex). For example, in order to prevent the CMM from falling into particular points of a sinusoidal oscillating function, the IPGW smooths the load function to provide a more accurate description of the current load. The smoothing is performed, for example, by the IPGW collecting instant load samples (e.g., every second) for a configurable predetermined period. Then based on a smoothing timer (e.g., a loadReportingSmoothingTimer), once the timer has expired, the IPGW proceeds to average the collected instant load values, and sets the current load of the IPGW (e.g., the currIPGWLoad) to that average. The IPGW then converts the current smoothed load to the Load Scale Index, based on the following function:

loadIndex=(currIPGWLoad*100)/maxLoadThreshold, or loadIndex=currIPGWLoad/Load_Unit STs may utilize the load information to select IPGWs while unassociated, as well as to determine whether to change IPGWs while idle (e.g., while in the Monitoring Load state 432). In order to avoid abrupt changes in load distribution based on movement of associated STs an associated terminal (while idle) may be restricted to making an association change only when the IPGW with which the ST is associated is highly loaded, or the IPGW with which the ST is associated is highly loaded relative to other IPGWs in the same pool. To determine whether these conditions apply, a Load Cutoff Percentage is used (e.g., Load_Cutoff_Percentage). The Load Cutoff Percentage is a configurable parameter, which is utilized to calculate a Load Cutoff (e.g. Load_Cutoff) that delineates between higher relative loads and lower relative loads. The Load Cutoff percentage is applied to a normalized range of loads of the IPGW Pool (e.g., ranging from min_Load_IPGW_Pool to max_Load_IPGW_Pool). According to an exemplary embodiment, the formula for calculating the Load Cutoff is:

$$\text{Load\_Cutoff} = \text{max\_Load\_IPGW\_Pool} - \left\{ \frac{\text{Load\_Cutoff\_Percentage}}{100} * [\text{max\_Load\_IPGW\_Pool} - \text{min\_Load\_IPGW\_Pool}] \right\}$$

Further, the following steps are repeated every time a CMM from an IPGW is received (where, Switch_IPGW_Threshold is a minimum configurable value below which the terminal would not consider associating with another IPGW: (1) calculate Load Cutoff; (2) if Current_Load of IPGW is greater or equal to the Load_Cutoff, and Current_Load of IPGW is greater or equal to Switch_IPGW_Threshold, then Rand returns a random number between 0 and 1; and (3) if Rand<$10^{((100-Current\_Load\_IPGW)/10)}$, then ST transitions to Selecting IPGW state 424.

Figure 5:
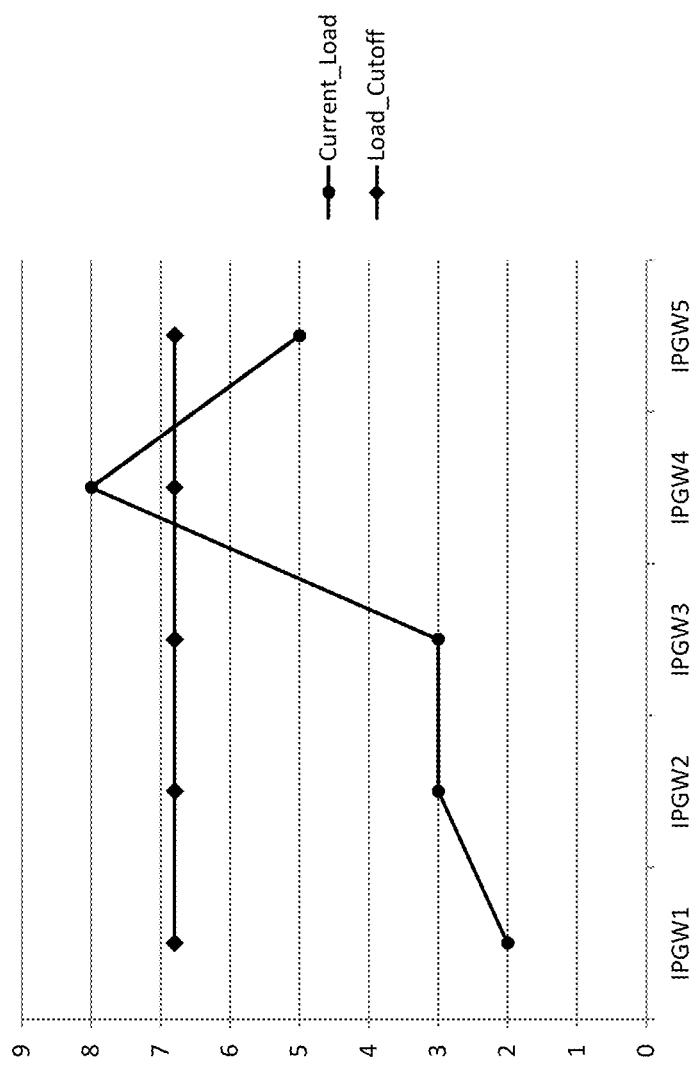
FIG. 5 depicts a graph illustrating an example scenario of IPGW loading relative to Load Cutoff for determining eligibility for ST switch-over to a new IPGW, in accordance with an exemplary embodiment.

The following example illustrates this process (with reference to FIG. 5—Note that FIG. 5 shows the Y-axis on a scale of 1-10 instead of 1-100, so multiplying the numbers of the Y-axis by 10 corresponds with the figures of the following example). The ST is configured with a Load_Cutoff_Percentage, which in this example is set to 20%. The ST is also monitoring the load of all IPGWs in its pool. From that monitoring, the terminal determines the minimum reported load and the maximum reported load across the IPGWs in the pool (e.g., min_Load_IPGW_Pool and max_Load_IPGW_Pool, respectively). In this example, min_Load_IPGW_Pool=50 and max_Load_IPGW_Pool=80. Based on these figures, the Load_Cutoff is calculated to be 68. A Load Cutoff of 68 means that an idle terminal associated with an IPGW whose load is greater than 68 would associate with a new IPGW, with some probability. In this example, only terminals on IPGW4 would consider reassociating.

Figure 4B:
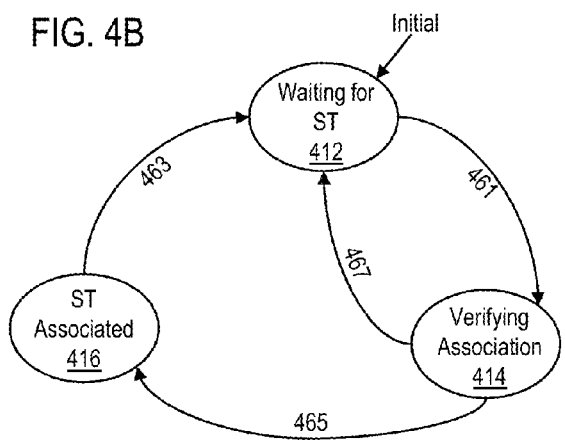
FIG. 4B depicts a state diagram illustrating the states of an IPGW, in accordance with an exemplary embodiment.

FIG. 4B depicts a state diagram illustrating the states of an IPGW, in accordance with an exemplary embodiment. The Waiting for Terminal state 412 is the initial IPGW state, which is a null state where the IPGW is not actively processing any information for a given ST. The IPGW leaves this state and transitions to the Verifying Association state 414 (e.g., transition 461) upon receiving an association request message from an ST that is not already in the Association Request Sent or ST Associated states (FIG. 4A, 426 and 430, respectively). The IPGW may also arrive in this state from the Terminal Associated state 416 if an ST sends an explicit association terminate message or the Association with an ST times-out due to a lack of keep-alive messaging (e.g., transition 463).

Once the IPGW receives an association request message from an ST, the IPGW enters the Verifying Association state 414 (e.g., transition 461). In this state, the IPGW determines whether it can provide the terminal service. Service is defined as the set of capabilities provided by an IPGW to a terminal to provide IP traffic to the terminal (such as sending to the terminal at a specific outroute throughput). The IPGW leaves the Verifying Association state 414 when it sends an association accept message in which case it transitions to the ST Associated state 416 (with respect to the newly associated ST) (e.g., transition 465), or when it sends an association reject message, in which case it transitions to the Waiting for Terminal state (e.g., transition 467). While in the Verifying Association state 414, the verification, for example, is performed according to the algorithm of FIG. 3D.

When in the ST associated state 416 (e.g., with respect to a particular associated ST), the IPGW periodically stores the ST usage information (regarding each associated ST) in a shared storage. When the IPGW leaves Terminal Associated state 416 (e.g., with respect to a particular ST that has become disassociated), it deletes all information about the particular terminal, and writes the latest usage information (since the last write) to the shared storage. Accordingly, a complete record of the usage information for the terminal should be stored (and preserved) in the shared storage. Every time the IPGW terminates an association with an ST, the IPGW may send out a real-time, reliable notification containing the Device ID for the ST and the association termination time.

Figure 6:
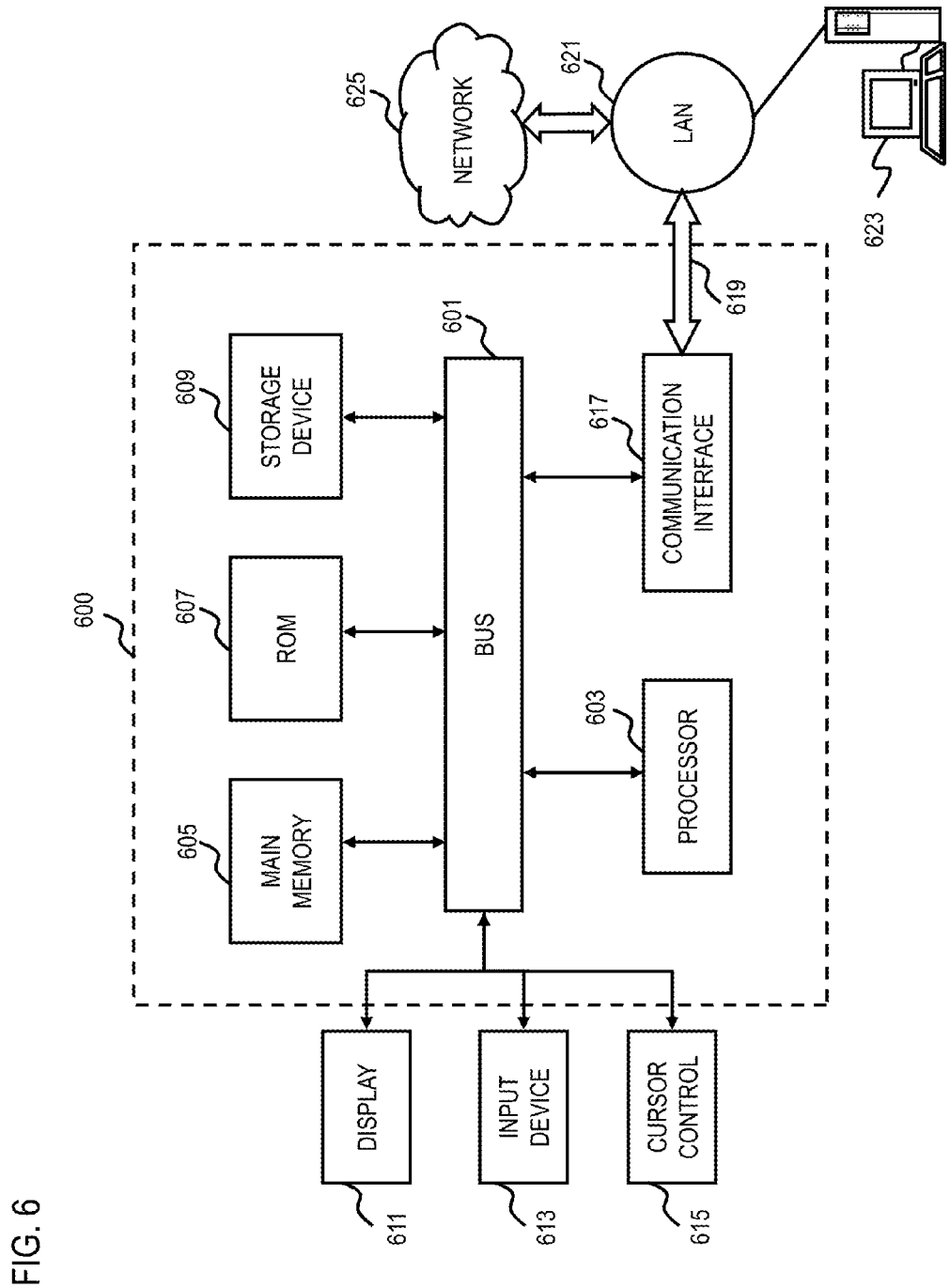
FIG. 6 depicts a diagram of a computer system on which architectures and methods for association of remote nodes with respective aggregation nodes may be implemented, according to exemplary embodiments.

FIG. 6 illustrates a computer system upon which exemplary embodiments according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 is coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, dynamic and flexible architectures and methods for association of remote nodes with respective aggregation nodes, in accordance with exemplary embodiments, are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hardwired circuitry is used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617, for example, includes peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 provides a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 sends messages and receives data, including program code, through the network(s), network link 619, and communication interface 617. In the Internet example, a server (not shown) might transmit requested code belonging to an application program for implementing an embodiment of the present invention through the network 625, local network 621 and communication interface 617. The processor 603 executes the transmitted code while being received and/or store the code in storage device 239, or other non-volatile storage for later execution. In this manner, computer system 600 obtains application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media may include dynamic memory, such as main memory 605. Transmission media may include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 7 illustrates a chip set 700 in which embodiments of the invention may be implemented. Chip set 700 includes, for instance, processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 includes one or more processing cores with each core configured to perform independently. A multi-core processor enables multiprocessing within a single physical package. Examples of a multi-core processor include two, four, eight, or greater numbers of processing cores. Alternatively or in addition, the processor 703 includes one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, and/or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM) and static memory (e.g., ROM) for storing executable instructions that, when executed by the processor 703 and/or the DSP 707 and/or the ASIC 709, perform the process of exemplary embodiments as described herein. The memory 705 also stores the data associated with or generated by the execution of the process.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a terminal device, a message transmitted by a gateway over a communications network, wherein the message includes service codes identifying one or more service capabilities of the gateway and load information specifying a load of the gateway;
   determining, based on the service codes, whether the gateway is an eligible gateway for servicing one or more service requirements of the terminal device;
   adding the gateway to a pool of eligible gateways within the communications network;
   maintaining, by the terminal device, a database of information regarding the gateways in the pool of eligible gateways, wherein the information of the database includes load information specifying a load for each of the gateways of the pool of eligible gateways;
   selecting a gateway from the pool of eligible gateways via a weighted random selection load balancing algorithm based on the load information of the gateways, including selecting a first gateway of the pool of eligible gateways, assigning a weighting factor to the first gateway based on the load information of the first gateway, wherein the weighting factor is inversely proportional to the load information, performing the selecting and assigning steps with respect to subsequent gateways of the pool of eligible gateways until all gateways of the pool have been processed, generating a weighted list of the gateways of the pool of eligible gateways, wherein the each gateway is included in the list a number of times based on its weighting factor, and generating a random index and selecting a gateway from the generated list of the gateways of the pool of eligible gateways based on the random index; and transmitting an association request message to the selected gateway.

2. The method according to claim 1, wherein the message is transmitted by the gateway via a multicast messaging protocol.

3. The method according to claim 1, wherein the service codes reflect one or more quantitative service criteria.

4. The method according to claim 1, wherein the determination whether the gateway is an eligible gateway for servicing the terminal comprises evaluating the service codes of the message to determine whether one or more of the service capabilities of the gateway correspond to the service requirements of the terminal device.

5. The method according to claim 1, further comprising: determining whether the gateway is a one of the pool of eligible gateways.

6. The method according to claim 5, wherein:
if it is determined that the gateway is one of the pool of eligible gateways, then the method further comprises determining whether a change sequence number included in the message indicates a configuration change of the gateway; and
if it is determined that the change sequence number indicates a configuration change of the gateway, then the method further comprises updating information associated with the gateway in a database of information regarding the gateways in the pool of eligible gateways.

7. The method according to claim 1, further comprising:
determining, based on the service codes, whether the service capabilities of the gateway include one or more special services; and
adding the gateway to a pool of special service gateways.

8. The method according to claim 7, wherein the one or more special services comprise a predetermined set of restricted services.

9. The method according to claim 1, further comprising:
determining, based on the service codes, whether the service capabilities of the gateway include a static network address service, and whether a subnet of the static network service is available.

10. The method according to claim 9, wherein the static network address service comprises one or more of IPv4 and IPv6.

11. The method according to claim 5, wherein, if it is determined that the gateway is one of the pool of eligible gateways, then the method further comprises:
waiting for one or more messages from one or more other eligible gateways; and
determining whether a message timer has expired.

12. The method according to claim 1, further comprising:
receiving, by the terminal device, an association accept message transmitted from the selected gateway in response to the association request message; and
associating with the selected gateway, in response to the association accept message, for transmission and receipt of service data traffic over the communications network via the associated gateway.

13. The method according to claim 12, further comprising:
receiving a periodic keep-alive message indicating that the association between the terminal device and the associated gateway is still active;
determining that the keep-alive messages have not been received for a preconfigured association time-out period; and
transmitting an association terminate message to the associated gateway.

14. The method according to claim 12, further comprising:
determining that messages have not been received from the associated gateway for a preconfigured association time-out period; and
transmitting an association terminate message to the associated gateway.

15. The method according to claim 12, further comprising:
receiving, by the terminal device, a further message from the associated gateway, wherein the further message includes a last reboot timestamp, indicating a last reboot time of the associated gateway:
determining that the last reboot timestamp indicates that the last reboot time of the associated gateway was after the time of association between the terminal device and the associated gateway; and
transmitting an association terminate message to the associated gateway.

16. An apparatus, comprising at least one processor and at least one memory including computer program code for one or more programs, wherein the at least one memory and the computer program code are configured to, with the at least one processor, cause the apparatus to perform at least the following:
receive a message transmitted by a gateway over a communications network, wherein the message includes service codes identifying one or more service capabilities of the gateway and load information specifying a load of the gateway;
determine, based on the service codes, whether the gateway is an eligible gateway for servicing one or more service requirements of the apparatus;
add the gateway to a pool of eligible gateways within the communications network;
maintain a database of information regarding the gateways in the pool of eligible gateways, wherein the information of the database includes load information specifying a load for each of the gateways of the pool of eligible gateways;
select a gateway from the pool of eligible gateways via a weighted random selection load balancing algorithm based on the load information of the gateways, including selecting a first gateway of the pool of eligible gateways, assigning a weighting factor to the first gateway based on the load information of the first gateway, wherein the weighting factor is inversely proportional to the load information, performing the selecting and assigning steps with respect to subsequent gateways of the pool of eligible gateways until all gateways of the pool have been processed, generating a weighted list of the gateways of the pool of eligible gateways, wherein the each gateway is included in the list a number of times based on its weighting factor, and generating a random index and selecting a gateway from the generated list of the gateways of the pool of eligible gateways based on the random index; and
transmit an association request message to the selected gateway.

17. The apparatus according to claim 16, wherein the message is transmitted by the gateway via a multicast messaging protocol.

18. The apparatus according to claim 16, wherein the service codes reflect one or more quantitative service criteria.

19. The apparatus according to claim 16, wherein the determination whether the gateway is an eligible gateway for servicing the apparatus comprises evaluating the service codes of the message to determine whether one or more of the service capabilities of the gateway correspond to the service requirements of the apparatus.

20. The apparatus according to claim 16, further comprising:
determining whether the gateway is a one of the pool of eligible gateways.

21. The apparatus according to claim 20, wherein:
if it is determined that the gateway is one of the pool of eligible gateways, then the apparatus is further caused to determine whether a change sequence number included in the message indicates a configuration change of the gateway; and
if it is determined that the change sequence number indicates a configuration change of the gateway, then the apparatus is further caused to update information associated with the gateway in a database of information regarding the gateways in the pool of eligible gateways.

22. The apparatus according to claim 16, wherein the apparatus is further caused to:
determine, based on the service codes, whether the service capabilities of the gateway include one or more special services; and
add the gateway to a pool of special service gateways.

23. The apparatus according to claim 22, wherein the one or more special services comprise a predetermined set of restricted services.

24. The apparatus according to claim 16, wherein the apparatus is further caused to:
determine, based on the service codes, whether the service capabilities of the gateway include a static network address service, and whether a subnet of the static network service is available.

25. The apparatus according to claim 24, wherein the static network address service comprises one or more of IPv4 and IPv6.

26. The apparatus according to claim 20, wherein, if it is determined that the gateway is one of the pool of eligible gateways, then the apparatus is further caused to:
wait for one or more messages from one or more other eligible gateways; and
determine whether a message timer has expired.

27. The apparatus according to claim 16, wherein the apparatus is further caused to:
receive an association accept message transmitted from the selected gateway in response to the association request message; and
associate with the selected gateway, in response to the association accept message, for transmission and receipt of service data traffic over the communications network via the associated gateway.

28. The apparatus according to claim 27, wherein the apparatus is further caused to:
receive a periodic keep-alive message indicating that the association between the apparatus and the associated gateway is still active;
determine that the keep-alive messages have not been received for a preconfigured association time-out period; and
transmit an association terminate message to the associated gateway.

29. The apparatus according to claim 27, wherein the apparatus is further caused to:
determine that messages have not been received from the associated gateway for a preconfigured association time-out period; and
transmit an association terminate message to the associated gateway.

30. The apparatus according to claim 27, wherein the apparatus is further caused to:
receive a further message from the associated gateway, wherein the further message includes a last reboot timestamp, indicating a last reboot time of the associated gateway;
determine that the last reboot timestamp indicates that the last reboot time of the associated gateway was after the time of association between the apparatus and the associated gateway; and
transmit an association terminate message to the associated gateway.

* * * * *